US009098626B2

(12) United States Patent
Gajula et al.

(10) Patent No.: US 9,098,626 B2
(45) Date of Patent: Aug. 4, 2015

(54) METHOD AND SYSTEM FOR LOG FILE PROCESSING AND GENERATING A GRAPHICAL USER INTERFACE BASED THEREON

(75) Inventors: Rakesh Gajula, Hyderabad (IN); Vinayaka Vasanth Prabhu, Hyderabad (IN); Balamurali Krishna Manyam, Hyderabad (IN); Nagaraj M. Hunur, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 1609 days.

(21) Appl. No.: 12/060,762

(22) Filed: Apr. 1, 2008

(65) Prior Publication Data

US 2009/0249250 A1 Oct. 1, 2009

(51) Int. Cl.

| | |
|---|---|
| ***G06F 3/00*** | (2006.01) |
| ***G06F 11/36*** | (2006.01) |
| ***G06F 11/263*** | (2006.01) |
| ***G06F 17/21*** | (2006.01) |
| ***G06F 11/34*** | (2006.01) |

(52) U.S. Cl.

CPC .......... *G06F 11/3636* (2013.01); *G06F 11/263* (2013.01); *G06F 11/3476* (2013.01); *G06F 11/3688* (2013.01); *G06F 17/218* (2013.01)

(58) Field of Classification Search

CPC . G06F 17/218; G06F 11/263; G06F 11/3688; G06F 11/3466; G06F 11/3636; G06F 11/3664; H04L 63/1425

USPC .......................... 717/124-125; 715/810, 841

See application file for complete search history.

(56) References Cited

U.S. PATENT DOCUMENTS

| | | | | |
|---|---|---|---|---|
| 6,003,143 | A * | 12/1999 | Kim et al. | 714/38.13 |
| 6,026,362 | A * | 2/2000 | Kim et al. | 705/317 |
| 6,247,020 | B1 * | 6/2001 | Minard | 1/1 |
| 6,427,232 | B1 * | 7/2002 | Ku et al. | 717/124 |
| 6,493,868 | B1 * | 12/2002 | DaSilva et al. | 717/105 |
| 6,792,595 | B1 * | 9/2004 | Storistenau et al. | 717/110 |
| 6,993,710 | B1 * | 1/2006 | Coad et al. | 715/202 |
| 7,120,901 | B2 * | 10/2006 | Ferri et al. | 717/128 |
| 7,191,445 | B2 * | 3/2007 | Brokish | 718/102 |
| 7,200,588 | B1 * | 4/2007 | Srivastava et al. | 1/1 |
| 7,284,153 | B2 * | 10/2007 | Okbay et al. | 714/30 |
| 7,284,194 | B2 * | 10/2007 | Gupta | 715/205 |
| 7,350,194 | B1 * | 3/2008 | Alpern | 717/124 |
| 7,376,937 | B1 * | 5/2008 | Srivastava et al. | 717/128 |
| 7,512,932 | B2 * | 3/2009 | Davidov et al. | 717/106 |
| 7,523,433 | B1 * | 4/2009 | Anderson | 716/139 |

(Continued)

*Primary Examiner* — Ryan Pitaro

(74) *Attorney, Agent, or Firm* — Kilpatrick Townsend & Stockton LLP

(57) ABSTRACT

A method and computer system for processing log file data, as well as to a graphical user interface for presenting the processed log file data is disclosed. Embodiments provide convenient mechanisms for processing log file data to generate a hierarchical representation of the log file data which more clearly indicates relationships between functions and information about one or more functions, where the log file data is processed in accordance with tag information associated with the application. The processed log file data may then be used to render a graphical user interface which displays the structured log file data. Nodes associated with nested functions may be indented with respect to parent nodes to indicate the nested relationship between functions. Additionally, the nodes may be expanded or collapsed to more clearly display the relationship between functions, to vary the amount of information displayed, etc.

31 Claims, 17 Drawing Sheets

(56) References Cited

U.S. PATENT DOCUMENTS

| | | | | |
|---|---|---|---|---|
| 7,735,069 | B2 * | 6/2010 | Bustelo et al. | 717/129 |
| 7,765,525 | B1 * | 7/2010 | Davidson et al. | 717/124 |
| 7,895,580 | B1 * | 2/2011 | Nikolov | 717/130 |
| 2002/0049790 | A1 * | 4/2002 | Ricker et al. | 707/513 |
| 2002/0152278 | A1 * | 10/2002 | Pontenzone et al. | 709/217 |
| 2002/0170005 | A1 * | 11/2002 | Hayes | 714/47 |
| 2002/0184366 | A1 * | 12/2002 | Kimoto et al. | 709/224 |
| 2003/0074440 | A1 * | 4/2003 | Grabarnik et al. | 709/224 |
| 2003/0159133 | A1 * | 8/2003 | Ferri et al. | 717/130 |
| 2003/0196192 | A1 * | 10/2003 | Barclay et al. | 717/128 |
| 2004/0189713 | A1 * | 9/2004 | Thames et al. | 345/810 |
| 2005/0010880 | A1 * | 1/2005 | Schubert et al. | 716/4 |
| 2005/0057771 | A1 * | 3/2005 | Ohishi et al. | 358/1.15 |
| 2005/0138483 | A1 * | 6/2005 | Hatonen et al. | 714/45 |
| 2005/0240620 | A1 * | 10/2005 | Danner et al. | 707/102 |
| 2005/0289401 | A1 * | 12/2005 | Goin et al. | 714/47 |
| 2006/0111888 | A1 * | 5/2006 | Hiew et al. | 703/22 |
| 2006/0190813 | A1 * | 8/2006 | Neil et al. | 715/513 |
| 2007/0168984 | A1 * | 7/2007 | Heishi et al. | 717/124 |
| 2007/0239799 | A1 * | 10/2007 | Modi | 707/202 |
| 2007/0250819 | A1 * | 10/2007 | Fjeldstad et al. | 717/129 |
| 2008/0263024 | A1 * | 10/2008 | Landschaft et al. | 707/5 |
| 2009/0049428 | A1 * | 2/2009 | Cozmei | 717/128 |
| 2009/0106741 | A1 * | 4/2009 | Dageville et al. | 717/128 |
| 2009/0300578 | A1 * | 12/2009 | Neil | 717/104 |
| 2010/0318978 | A1 * | 12/2010 | Nikolov et al. | 717/148 |
| 2012/0167052 | A1 * | 6/2012 | Fjeldstad et al. | 717/125 |

* cited by examiner

120

| | | | |
|---|---|---|---|
| | 1 | --A Very Generic Simple log(trace) file | |
| | 2 | Entering Procedure TASK | 10 |
| | 3 | Initializing cache for TASK 235 | 20 |
| | 4 | i am a debug task statement1 | 40 |
| | 5 | f=2 | |
| | 6 | g=3 | |
| | 7 | h=5 | |
| | 8 | i am a debug task statement2 | 40 |
| | 9 | i am a debug task statement3 | 40 |
| 210 | 10 | Entering Procedure ADD | 10 |
| | 11 | Initializing cache for ADD 23 | 20 |
| | 12 | starting ADD | 30 |
| 220 | 13 | x=2 | |
| | 14 | y=3 | |
| 230 | 15 | i am a debug add statement1 | 40 |
| | 16 | i am a debug add statement2 | 50 |
| | 17 | i am a debug add statement3 | 60 |
| 240 | 18 | z=5 | |
| 250 | 19 | Leaving Procedure ADD | 10 |
| | 20 | i am a debug task statement4 | 40 |
| | 21 | i am a debug task statement5 | 40 |
| | 22 | Entering Procedure MUL | 10 |
| | 23 | Initializing cache for MUL 55 | 20 |
| | 24 | starting MUL | 30 |
| | 25 | z=5 | |
| | 26 | r=5 | |
| | 27 | i am a debug mul statement1 | 40 |
| | 28 | i am a debug mul statement2 | 50 |
| | 29 | i am a debug mul statement3 | 60 |
| | 30 | k=25 | |
| | 31 | Leaving Procedure MUL | 10 |
| | 32 | i am a debug task statement6 | 40 |
| | 33 | i am a debug task statement7 | 40 |
| | 34 | result=25 | |
| | 35 | Leaving Procedure TASK | 10 |
| | 36 | exit... | |

FIGURE 2

130  1  `<?xml versions="1.0" encoding="UTF-8"?>¶`
     2  `<root>`
     3  `<process>`
     4  `<processid>PROCESSID0</processid>`
     5  `<processname>Task Process</processname>`
     6  `<node>`
310 ─ 7  `<nodeid>NODEID0</nodeid>`
     8  `<name>Task</name>`
     9  `<start>`
    10  `<ssl>Entering Procedure TASK         10</ssl>`
312 ─ 11 `<regexss2>Initialising cache for TASK (?*)</regexss2>`
    12  `</start>`
314 ─ 13 `<end>`
    14  `<es2>Leaving Procedure Task          10</es2>`
    15  `</end>`
    16  `<parameter>`
    17  `<param-name>Parameter F</param-name>`
    18  `<param-expression>f=(?*)</param-expression>`
    19  `</parameter>`
    20  `<parameter>`
    21  `<param-name>Parameter G</param-name>`
    22  `<param-expression>g=(?*)</param-expression>`
316 ─ 23 `</parameter>`
    24  `<parameter>`
    25  `<param-name>Parameter H</param-name>`
    26  `<param-expression>h=(?*)</param-expression>`
    27  `</parameter>`
    28  `<parameter>`
    29  `<param-name>Result</param-name>`
    30  `<param-expression>result=(?*)</param-expression>`
    31  `</parameter>`
    32  `</node>`
    33  `<node>`
320 ─ 34 `<nodeid>NODEID1</nodeid>`
    35  `<name>Addition</name>`
    36  `<start>`
322 ─ 37 `<ssl>Entering Procedure ADD          10</ssl>`
    38  `<regexss2>Initialising cache for ADD (?*)</regexss2>`
    39  `</start>`

FIGURE 3

```
40      <end>
41          <esl>Leaving Procedure ADD         10</esl>
42      </end>
43      <parameter>
44      <param-name>Parameter X</param-name>
45      <param-expression>x=(?*)</param-expression>
46      </parameter>
47      <parameter>
48      <param-name>Parameter Y</param-name>
49      <param-expression>y=(?*)</param-expression>
50      </parameter>
51      <parameter>
52      <param-name>Parameter Z</param-name>
53      <param-expression>z=(?*)</param-expression>
54      </parameter>
55  </node>
56  <node>
57      <nodeid>NODEID2</nodeid>
58      <name>Multiplication</name>
59      <start>
60          <ssl>Entering Procedure MUL         10</ssl>
61          <regexss2>Initialising cache for MUL  (?*)</regexss2>
62      </start>
63      <end>
64          <esl>Leaving Procedure MUL          10</esl>
65      </end>
66      <parameter>
67      <param-name>Parameter Z</param-name>
68      <param-expression>z=(?*)</param-expression>
69      </parameter>
70      <parameter>
71      <param-name>Parameter R</param-name>
72      <param-expression>r=(?*)</param-expression>
73      </parameter>
74      <parameter>
75      <param-name>Parameter K</param-name>
76      <param-expression>k=(?*)</param-expression>
77      </parameter>
78  </node>
79  </process>
80  </root>
81
```

```
--A Very Generic Simple log(trace) file
Entering Procedure TASK                     10
Initializing cache for TASK 235             20
i am a debug task statement1                40
f=2
g=3
h=5
i am a debug task statement2                40
i am a debug task statement3                40
Entering Procedure ADD                      10
Initializing cache for ADD 23               20
starting ADD                                30
x=2
y=3
i am a debug add statement1                 40
i am a debug add statement2                 50
i am a debug add statement3                 60
z=5
Leaving Procedure ADD                       10
i am a debug task statement4                40
i am a debug task statement5                40
1210 Entering Procedure MUL                 10
Initializing cache for MUL 55               20
starting MUL                                30
z=5
r=5
i am a debug mul statement1                 40
i am a debug task statement6                50
i am a debug task statement7                60
1220 result=null
Leaving Procedure TASK                      10
exit...
```

FIGURE 12

METHOD AND SYSTEM FOR LOG FILE PROCESSING AND GENERATING A GRAPHICAL USER INTERFACE BASED THEREON

BACKGROUND OF THE INVENTION

Most conventional software applications generate trace files or log files during execution. The log files can be used to debug the software applications, either locally or remotely. For example, a software application running remotely on a customer's computer system can be debugged using the log file generated by the application.

Log files are generally large text files with little or no formatting. As such, parsing a log file to debug a program is difficult, tedious, and time consuming. Additionally, log files generally fail to clearly convey function hierarchy or sequence, thereby making it difficult to trace the flow of control within the application. Thus, debugging the program generally requires significant skill and familiarity with the application.

SUMMARY OF THE INVENTION

Accordingly, a need exists for presentation of log file data in a manner which reduces the time and difficulty associated with debugging an application. A need also exists for presentation of log file data which reduces the difficulty of tracing the flow of control within the application. Additionally, a need exists for presentation of log file data in a manner which enables debugging of an application with less skill and less familiarity with the application. Embodiments of the present invention provide novel solutions to these needs and others as described below.

Embodiments of the present invention are directed to a method and computer system for processing log file data, as well as to a graphical user interface for presenting the processed log file data. More specifically, embodiments provide convenient mechanisms for processing log file data to generate a hierarchical representation of the log file data which more clearly indicates relationships between functions (e.g., a function within which another function is nested, etc.) and information about one or more functions (e.g., input parameters of the function, output parameters of the function, etc.), where the log file data is processed in accordance with tag information (e.g., indicating entry and exit points of a function, which log file entries are associated with which nodes of the hierarchy, etc.) associated with the application. The processed log file data may then be used to render a graphical user interface which displays the structured log file data. Nodes associated with nested functions may be indented with respect to parent nodes to indicate the nested relationship between functions. Additionally, the nodes may be expanded or collapsed to more clearly display the relationship between functions, to vary the amount of information displayed, etc. Thus, the structured log file data may be used to more easily trace the flow of control within the application, thereby enabling more convenient, efficient, and cost-effective debugging of the application.

In one embodiment, a computer-implemented method of processing data from a log file includes accessing the data from the log file, the data generated during execution of an application (e.g., a debug statement generated by the application, an entry point of a function of the application, an exit point of the function, an input parameter of the function, an output parameter of the function, etc.). Tag information (e.g., including metadata formatted in XML, etc.) associated with the application is accessed, wherein the tag information includes at least one tag associated with a function entry point and at least one tag associated with a function exit point. The data is processed in accordance with the tag information to generate processed log file data, wherein the processed log file data is operable to facilitate application debugging operations. The processed log file data may include information for displaying a hierarchy, where the hierarchy is for organizing the data using a plurality of nodes. The processing of the data may further include comparing the data with the tag information. A first function identified in the data may be assigned to a first node based upon the comparing, while a second function identified in the data may be assigned to a second node based upon the comparing, wherein the second function is nested within the first function, and wherein the second node comprises a child node of the first node. Additionally, a graphical user interface may be displayed for presenting the data, wherein the displaying the graphical user interface may further include displaying the first node, displaying the second node beneath the first node, and in response to interaction with the second node, displaying node information associated with the second function, wherein the node information comprises a portion of the data.

In another embodiment, a graphical user interface for presenting data from a log file may include a first region (e.g., a check box for selecting the log file, a menu for selecting the log file, a user-modifiable field for entering a location of the log file, etc.) for identifying the data from the log file, the data generated during execution of an application. The graphical user interface may also include a second region for displaying a hierarchical organization of the data from the log file, wherein the hierarchical organization is generated in accordance with tag information associated with the application. The second region may include a first node associated with a first function of an application. The second region may also include a second node associated with a second function of the application, wherein the first node is operable to be expanded to reveal the second node, and wherein the second node is operable to be expanded to reveal node information associated with the second function. The graphical user interface may also include a third region for identifying a location of the tag information, and wherein the third region may include a graphical object selected from a group consisting of a check box for selecting the application data, a menu for selecting the application data, and a user-modifiable field for entering a location of the application data. The first and second nodes may be collapsed (e.g., in response to user interaction with the graphical user interface) to display less information. Additionally, the second region may further include a region for displaying at least one function parameter associated with the function, wherein the at least one function parameter may be selected from a group consisting of an input parameter of the function and an output parameter of the function. The node information associated with the second function may include a portion of the data, and wherein the second node may be displayed at a position indented from a position of the first node. Additionally, the first node may be further operable to be expanded to reveal node information associated with the first function.

BRIEF DESCRIPTION OF THE DRAWINGS

The present invention is illustrated by way of example, and not by way of limitation, in the figures of the accompanying drawings and in which like reference numerals refer to similar elements.

FIG. 2 shows a display or print out of an exemplary log file data in accordance with one embodiment of the present invention.

FIG. 3 shows exemplary tag information in accordance with one embodiment of the present invention.

FIG. 12 shows a display or print out of an exemplary log file data for an error or exception in accordance with one embodiment of the present invention.

DETAILED DESCRIPTION OF THE INVENTION

Figure 1:
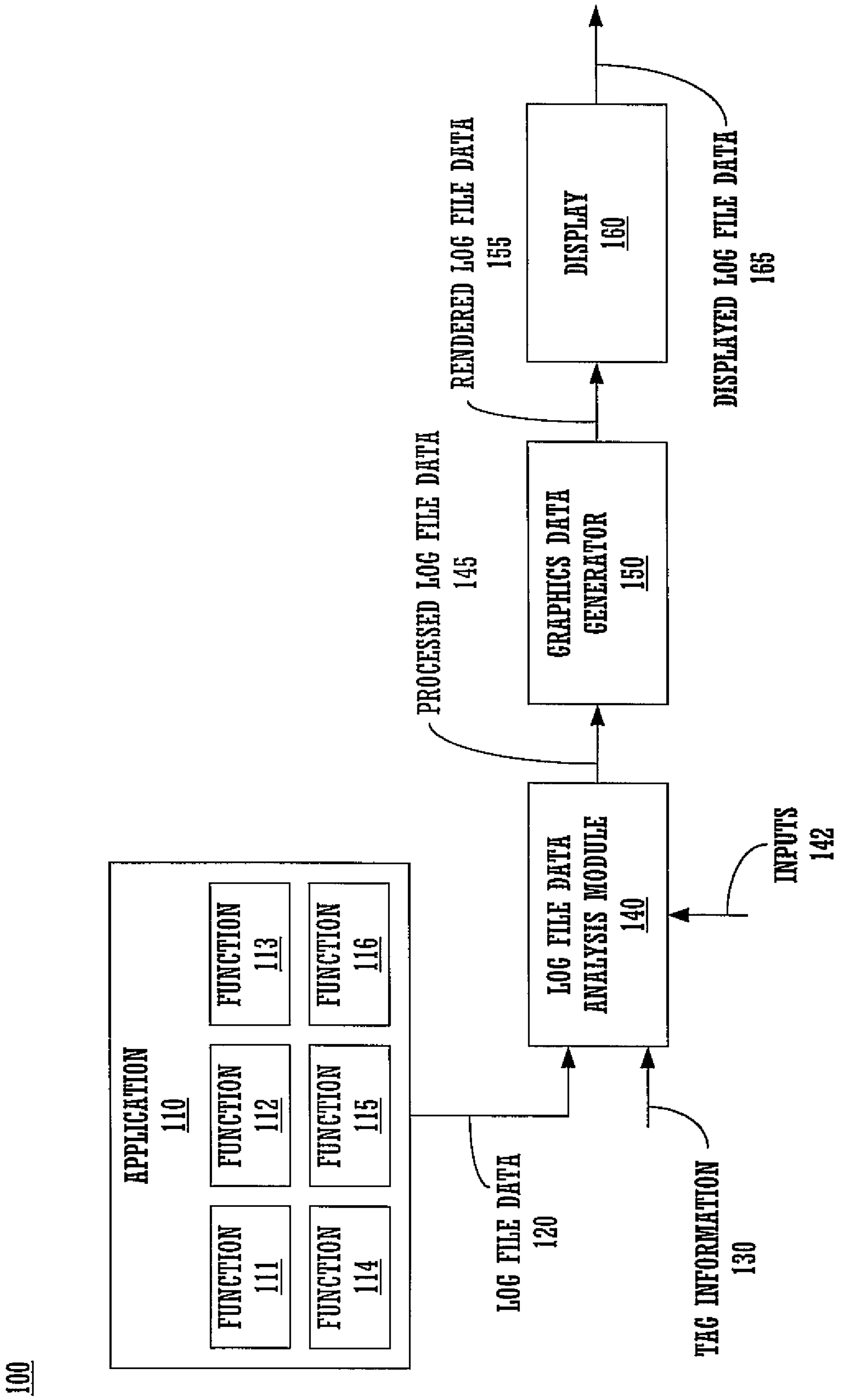
FIG. 1 shows an exemplary data flow diagram for processing log file data in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting," "creating," "debugging," "defining," "depicting," "detecting," "determining," "displaying," "establishing," "executing," "flipping," "generating," "grouping," "hiding," "identifying," "initiating," "interacting," "modifying," "monitoring," "moving," "outputting," "performing," "placing," "presenting," "processing," "programming," "querying" "removing," "repeating," "resuming," "sampling," "simulating," "sorting," "storing," "subtracting," "suspending," "tracking," "transcoding," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

FIG. 1 shows exemplary data flow diagram 100 for processing log file data in accordance with one embodiment of the present invention. As shown in FIG. 1, application 110 may comprise an executable software application (e.g., for execution by computer system 1400 of FIG. 14). In one embodiment, application 110 may comprise a plurality of functions (e.g., functions 111-116). During execution of application 110, log file data 120 may be generated by application 110.

As shown in FIG. 1, log file data 120 may comprise a debug statement generated by application 110 (e.g., during execution of one or more of functions 111-116). The debug statement may indicate an error or exception encountered during execution of application 110. Alternatively, the debug statement may indicate a state of application 110 and/or a system executing application 110 at the time of that the debug statement is generated. And in other embodiments, the debug statement may be otherwise associated with the functioning of application 110.

Log file data 120 may comprise an entry point and/or exit point of a function (e.g., 111-116) of application 110 in one embodiment. For example, upon beginning execution of a function (e.g., function 111, function 112, etc.), application 110 may generate log file data (e.g., 120) indicating that the function is being entered. Alternatively, upon completing execution of a function (e.g., function 111, function 112, etc.), application 110 may generate log file data (e.g., 120) indicating that the function is being exited.

As shown in FIG. 1, log file data 120 may comprise an input parameter and/or an output parameter of a function. For example, log file data 120 may indicate one or more input parameters (e.g., variables or values received from another function, variables or values accessed from another source, etc.) used by at least one function (e.g., 111, 112, etc.) of an application (e.g., 110) in one embodiment. Alternatively, log file data 120 may indicate one or more output parameters (e.g., variables or values used by the function and output to another function) of one or more functions (e.g., 111, 112, etc.).

FIG. 2 shows a display or print out of an exemplary log file data 120 in accordance with one embodiment of the present invention. Log file data 120 comprises 36 entries generated during execution of application 110. In one embodiment, the entries may be arranged in chronological (e.g., the entry on line 2 may occur before the entry on line 3, etc.).

As shown in FIG. 2, entry 210 may indicate that the function "ADD" is being entered. In one embodiment, the function "ADD" may be represented by the equation "z=x+y." Entry 220 may represent input parameters (e.g., "x" and "y") used by the function "ADD." Entries 230 may represent debug statements generated by the application (e.g., 110) during execution of the "ADD" function. Entry 240 may represent output parameters (e.g., z), or results, generated by the "ADD" function. For example, the "z" parameter may be assigned a value of 5 since the value of the "x" parameter is 2 and the value of the "y" parameter is 3, and the sum of 2 and 3 is 5. Additionally, entry 250 may indicate that the function "ADD" is being exited.

Turning back to FIG. 1, log file data analysis module 140 may process log file data 120 in accordance with tag information 130 to generate processed log file data 145. In one embodiment, tag information 130 may comprise a plurality of tags which may be used to create a hierarchy for organizing log file data 120. For example, log file data 120 may be compared to tag information 130 until a match is found. Upon locating a match, the matching information may be assigned to a node. Each of the nodes may also be assigned a hierarchy level (e.g., indicating the priority or parent/child relationship of each node with respect to other nodes) based upon information from log file data 120 and/or tag information 130, thereby enabling the entries of log file data 120 to be prioritized and placed within a hierarchical structure. The hierarchy (e.g., represented by processed log file data 145) may then be used to trace the flow of control within an application (e.g., 110), thereby enabling more convenient, efficient, and cost-effective debugging of the application (e.g., 110).

In one embodiment, log file data 120 may comprise a text file, tag information 130 may be formatted in XML, and processed log file data 145 may be formatted in XML. As such, in one embodiment, module 140 may be capable of generating processed log file data (e.g., 145) formatted in XML from log file data comprising a text file and tag information (e.g., 130) formatted in XML.

FIG. 3 shows exemplary tag information 130 in accordance with one embodiment of the present invention. Tag information 130 comprises a plurality of tags for organizing or structuring log file data 120, where each tag is associated with a node. In this manner, tag information 130 may comprise metadata (e.g., formatted in XML, formatted in another coding language, etc.) in one embodiment. As shown in FIG. 3, tags 312-314 are associated with a first node (e.g., identified by node identification information 310), tags 322-324 are associated with a second node (e.g., identified by node identification information 320), and tags 332-334 are associated with a third node (e.g., identified by node identification information 330). As such, portions of log file data 120 may be matched to the tags of tag information 130 (e.g., by module 140 of FIG. 1) and assigned to a node associated with one or more tags. Once assigned to a node, each node may be assigned a hierarchy level to organize or provide structure to log file data 120 (e.g., thereby creating processed log file data 145).

The tags (e.g., of tag information 130) used for organizing log file data 120 may be associated with function entry and/or exit points in one embodiment. For example, tag 312 is associated with the entry point of a task function (referred to as "TASK" in FIG. 3), tag 314 is associated with the exit point of the task function, tag 322 is associated with the entry point of an addition function (referred to as "ADD" in FIG. 3), tag 324 is associated with the exit point of the addition function, tag 332 is associated with the entry point of a multiplication function (referred to as "MUL" in FIG. 3), and tag 334 is associated with the exit point of the multiplication function. As such, the tags associated with functions (e.g., entry and/or exit points of the functions) may be used to parse log file data 120 and determine the organization or control flow of various functions (e.g., of application 110) referred to in log file data 120.

Tag information 130 may comprise tags associated with function parameters (e.g., associated with functions referred to in log file data 120). The function parameter tags (e.g., 316, 326, and 336) may be associated with a respective function and function node (e.g., tag 316 is associated with the first node, tag 326 is associated with the second node, and tag 336 is associated with the third node). The function parameters may comprise input parameters (e.g., variables or values received from another function, variables or values accessed from another source, etc.) used by a function (e.g., 111, 112, etc.) and/or output parameters (e.g., variables or values used by the function and output to another function) of the function (e.g., 111, 112, etc.). As such, the function parameter tags (e.g., 316-336) may be used to access a value for a given parameter from log file data 120 (e.g., tags 326 may be used to determine that x=2, y=3 and z=5), where the function parameter and/or function parameter value may be subsequently accessed to provide information about the corresponding function (e.g., 111, 112, etc.) and/or application (e.g., 110).

Tag information 130 may also comprise tags associated with debug statements in one embodiment. The content of the tag may be compared with log file data 120 to identify a debug statement in log file data 120 which matches the tag. Upon detecting a match, the entry in the log file data 120 and/or information in tag information 130 associated with the tag may be used for another purpose (e.g., for aiding in organizing log file data 120, for altering display of the processed log file data, etc.).

As shown in FIG. 3, each tag may comprise one or more lines or entries which may be matched to one or more corresponding entries of log file data 120. For example, tag 312 comprises two lines (e.g., a first line "Entering Procedure TASK" and a second line "Initialising cache for TASK"). As another example, tag 314 comprises a single line (e.g., "Leaving Procedure TASK"). Alternatively, tags may comprise patterns of letters, characters, words, etc., where the tag may comprise a whole line or a portion thereof. For example, a tag of tag information 130 (e.g., comprising "<*123>") may be used to identify an entry in log file data 120 which ends in the numbers "123." It should be appreciated that other combinations or patterns may be identified using appropriate tags for identifying such combinations or patterns.

In one embodiment, application 110 may execute a function "task," where task calls two additional functions "addition" and "multiplication." The task function may take as inputs the parameters f, g and h. The addition function may perform the following calculation: z=x+y. The addition function may take as inputs the parameters f and g, and set x equal to f and y equal to g. Additionally, the multiplication function may perform the following calculation: k=z*r. The multiplication function may take as inputs the parameters h (e.g., from the task function) and z (e.g., from the addition function), and set r equal to h. The task function may receive k output from the multiplication function and set it equal to the parameter "result," where "result" is then output by the task function.

As such, tag information 130 identifies the task function (e.g., using tag 312 as the entry point and tag 314 as the exit point), the addition function (e.g., using tag 322 as the entry point and tag 324 as the exit point), and the multiplication function (e.g., using tag 332 as the entry point and tag 334 as the exit point). In this manner, tag information 130 may be application-specific (e.g., specific to application 110) in one embodiment. Further, tag information 130 may assign each function to a respective node (e.g., the task function is assigned to a first node labeled "NODEID0," the addition function is assigned to a second node labeled "NODEID1," and the multiplication function is assigned to a third node labeled "NODEID2").

Accordingly, in one embodiment when comparing tag information 130 with log file data 120, tag 312 may be associated with lines 3 and 4 of log file data 120, and tag 314 may be associated with line 35 of log file data 120. Tag 322 may be associated with lines 10 and 11 of log file data 120 (e.g., entry 210), and tag 324 may be associated with line 19 of log file data 120 (e.g., entry 250). Additionally, tag 332 may be associated with lines 22 to 23 of log file data 120, and tag 334 may be associated with line 31 of log file data 120.

Thereafter, log file data 120 may be analyzed (e.g., by module 140) to assign a respective hierarchy level to each function. In one embodiment, functions which are not called by any other functions may be assigned a highest hierarchy level. As shown in FIG. 2, the task function is the first function to be called (e.g., identified by tag 312) and is the last function to be exited (e.g., identified by tag 314) with no additional exits or entries in between, and therefore, the task function (and/or its corresponding node) may be assigned the highest hierarchy level. Since both the addition function and the multiplication function enter and exit between the entry and exit points of the task function (e.g., indicating that both the addition and multiplication functions are called by the task function), both the addition and multiplication functions (and/or their corresponding nodes) may be assigned a lower hierarchy level than the task function. Additionally, since the portions of log file data 120 associated with the addition and multiplication functions do not overlap (e.g., indicating that neither the addition function nor the multiplication function call one another), both the addition and multiplication functions (and/or their corresponding nodes) may be assigned the same hierarchy level in one embodiment. Further, since no addition tags fall within the respective portions associated with the addition and multiplication functions (e.g., indicating that neither the addition function nor the multiplication function call any additional functions), it may be determined that the control flow analysis for application 110 is complete in one embodiment.

Alternatively, once each function is assigned a node, information from tag information 130 (not shown in FIG. 3) may be accessed and used to assign a respective hierarchy level to each function and/or each respective node. For example, tag information 130 may comprise a pre-determined hierarchy level for each node. In another embodiment, information from tag information 130 may be used in conjunction with information from log file data 120 to determine control flow for functions of an application (e.g., 110). For example, contextual information from log file data 120 may be determined based upon the ordering of log file entries in log file data 120. This information may then be used with addition information from tag information 130 to determine and assign respective hierarchy levels to the functions.

Turning back to FIG. 1, graphics data generator 150 may receive processed log file data 145 from module 140. Graphics data generator 150 may use processed log file data 145 to generate rendered log file data 155 in one embodiment. Display 160 may access rendered log file data 155 and output displayed log file data 165 based thereon. Accordingly, graphics data generator 150 and/or display 160 may be used to generate and present a graphical user interface (e.g., as depicted in FIGS. 4-8) based upon processed log file data 145.

Additionally, module 140 may receive inputs 142 (e.g., user inputs, automated inputs, etc.). The inputs (e.g., 142) may be used to configure or program module 140 to alter the processed log file data (e.g., 145) output by module 140. For example, inputs 142 may comprise a command to hide the display of information related to a given function (or a command to display information related to all functions except for the given function). As such, in one embodiment, the displayed log file data (e.g., 165) output by display 160 may comprise a graphical user interface for presenting information about all functions except for the given function which was deselected or otherwise indicated by inputs 142.

Figure 4A:
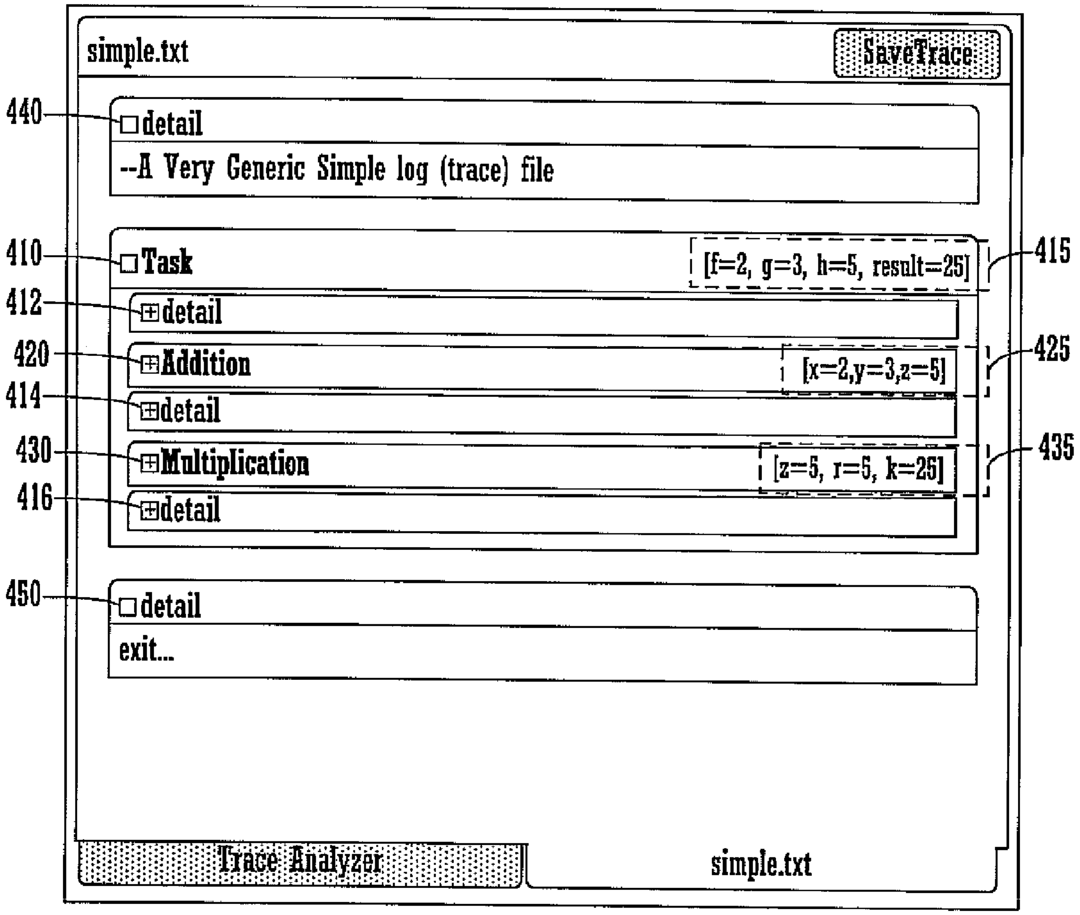
FIG. 4A shows an exemplary on-screen graphical user interface for presenting log file data in accordance with one embodiment of the present invention.
Figure 4B:
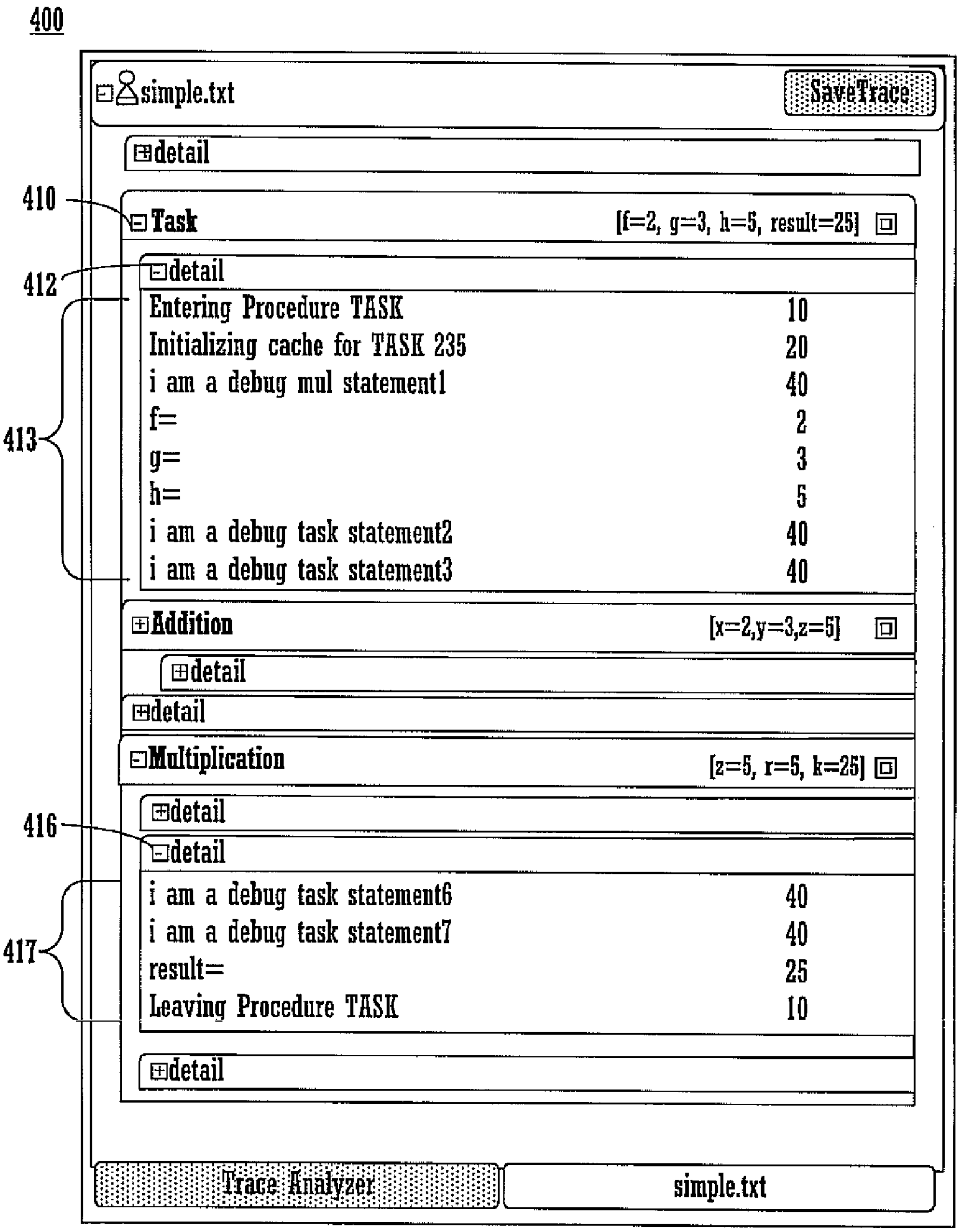
FIG. 4B shows an exemplary on-screen configuration of a graphical user interface displaying associated log file data in accordance with one embodiment of the present invention.
Figure 4C:
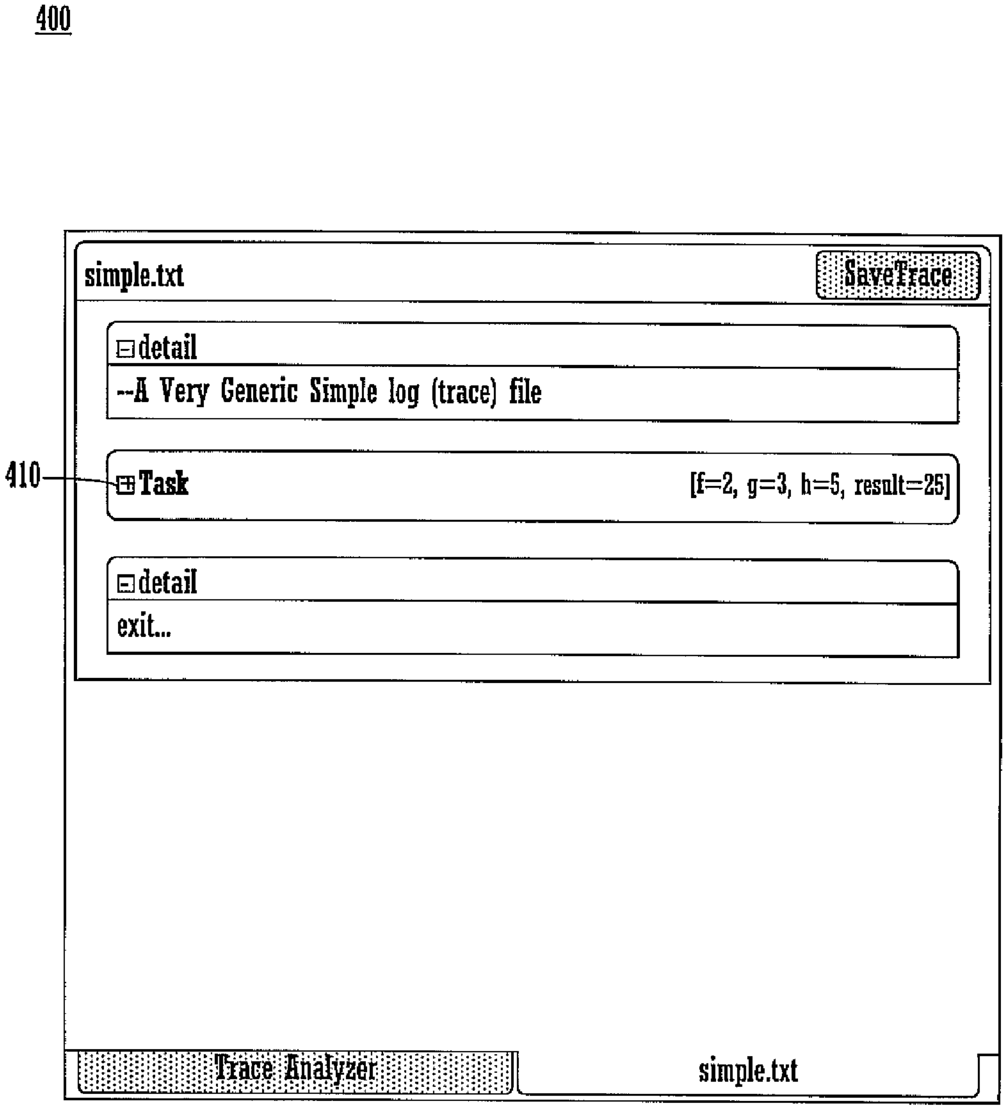
FIG. 4C shows an exemplary configuration of an on-screen graphical user interface with at least one hidden node in accordance with one embodiment of the present invention.

FIGS. 4A, 4B, and 4C show exemplary on-screen graphical user interface 400 in different configurations in accordance with one embodiment of the present invention. As shown in FIG. 4A, graphical user interface 400 comprises a plurality of expandable and collapsible nodes for presenting and/or organizing log file data (e.g., 120). For example, node 410 is associated with a task function (e.g., associated with node identification information 310 as shown in FIG. 3, whose entry point in application 110 is indicated by lines 2 and/or 3 of log file data 120 as shown in FIG. 2, and whose exit point in application 110 is indicated by line 35 of log file data 120 as shown in FIG. 2), node 420 is associated with an addition function (e.g., associated with node identification information 320 as shown in FIG. 3, whose entry point in application 110 is indicated by lines 10 and/or 11 of log file data 120 as shown in FIG. 2, and whose exit point in application 110 is indicated by line 19 of log file data 120 as shown in FIG. 2), and node 430 is associated with a multiplication function (e.g., associated with node identification information 330 as shown in FIG. 3, whose entry point in application 110 is indicated by lines 22 and/or 23 of log file data 120 as shown in FIG. 2, and whose exit point in application 110 is indicated by line 31 of log file data 120 as shown in FIG. 2).

In one embodiment, node 410 may be assigned a higher hierarchy level than nodes 420 and 430 since the addition function (e.g., assigned to node 420) and multiplication function (e.g., assigned to node 430) are called by the task function (e.g., assigned to node 410). In this manner, nodes 420 and 430 may be child nodes of node 410, while node 410 may be a parent node of nodes 420 and 430. As shown in FIG. 4A, nodes 420 and 430 may be indented from node 410 to more clearly indicate the relationship between the functions (e.g., the task, addition, and multiplication functions) and enable easier and more efficient tracing of control flow for the application (e.g., 110).

Graphical user interface 400 may comprise graphical objects 412, 414, and 416 for displaying portions of the log file data (e.g., 120) corresponding to the task function (e.g., assigned to node 410). Each of graphical objects 412, 414, and 416 may be expanded (e.g., in response to user interaction with graphical user interface 400) to reveal more of log file data 120, and each of graphical objects 412, 414, and 416 may be collapsed (e.g., in response to user interaction with graphical user interface 400) to hide one or more portions of log file data 120. For example, interaction with graphical object 412 may cause the display and/or hiding of log file data occurring before reference to the addition function (e.g., lines 4-9 of log file data 120 as shown in FIG. 2, log file data 413 associated with graphical object 412 as shown in FIG. 4B, etc.). Interaction with graphical object 414 may cause the display and/or hiding of log file data occurring after reference to the addition function and before reference to the multiplication function (e.g., lines 20-21 of log file data 120 as shown in FIG. 2). Additionally, interaction with graphical object 416 may cause the display and/or hiding of log file data occurring after reference to the multiplication function (e.g., lines 32-34 of log file data 120 as shown in FIG. 2, log file data 417 associated with graphical object 416 as shown in FIG. 4B, etc.).

Additionally, each of nodes 410, 420, and 430 may be expanded (e.g., in response to user interaction with graphical user interface 400) to reveal more of log file data 120, and each of nodes 410, 420, and 430 may be collapsed (e.g., in response to user interaction with graphical user interface 400) to hide one or more portions of log file data 120. For example, interaction with node 410 may cause the display and/or hiding of at least one child node (e.g., nodes 420 and 430) and/or at least one graphical object (e.g., 412, 414, 416, etc.) associated with node 410. FIG. 4C shows an exemplary configuration of graphical user interface 400 with at least one hidden node (e.g., nodes 420 and 430) in accordance with one embodiment of the present invention, where the configuration depicted in FIG. 4B may be entered in response to interaction with node 410 in one embodiment. Further, interaction with node 420 and/or 430 may cause the display and/or hiding of log file data (e.g., 120) associated with each respective node (e.g., lines 11-18 of FIG. 2 associated with node 420, lines 23-30 of FIG. 2 associated with node 430, etc.).

As shown in FIGS. 4A, 4B, and 4C, graphical object 440 may be associated with portions of log file data (e.g., 120) occurring before entry of the task function (e.g., line 1 of log file data 120 as shown in FIG. 2). For example, graphical object 440 may be expanded (e.g., as shown in FIG. 4A) to reveal log file data occurring before entry of the task function and/or collapsed (e.g., as shown in FIG. B) to hide the log file data occurring before entry of the task function.

Alternatively, as shown in FIGS. 4A, 4B, and 4C, graphical object 450 may be associated with portions of log file data (e.g., 120) occurring after exit of the task function (e.g., line 36 of log file data 120 as shown in FIG. 2). For example, graphical object 450 may be expanded (e.g., as shown in FIG. 4A) to reveal log file data occurring after exit of the task function and/or collapsed (e.g., as shown in FIG. B) to hide the log file data occurring after exit of the task function.

Additionally, as shown in FIG. 4A, graphical user interface 400 may display function parameters associated with one or more functions of the application (e.g., 110). For example, function parameters 415 may be displayed for the task function (e.g., associated with node 410), function parameters 425 may be displayed for the addition function (e.g., associated with node 420), and function parameters 435 may be displayed for the multiplication function (e.g., associated with node 430). The function parameters (e.g., 415, 425, 435, etc.) may comprise input parameters (e.g., parameters received and used by a function), output parameters (e.g., parameters accessed and output by a function), other parameters accessed by a function of an application (e.g., 110), or some combination thereof. Accordingly, the function parameters (e.g., 415-435) presented by graphical user interface 400 may enable convenient viewing of function parameters associated with a function (e.g., the task function, the addition function, the multiplication function, etc.) without the display of associated log file data (e.g., associated with one or more function nodes and referencing one or more of the function parameters), thereby enabling more data to be fit in a smaller displayed area to facilitate more efficient and more convenient tracing of the control flow of the application (e.g., 110).

Figure 5:
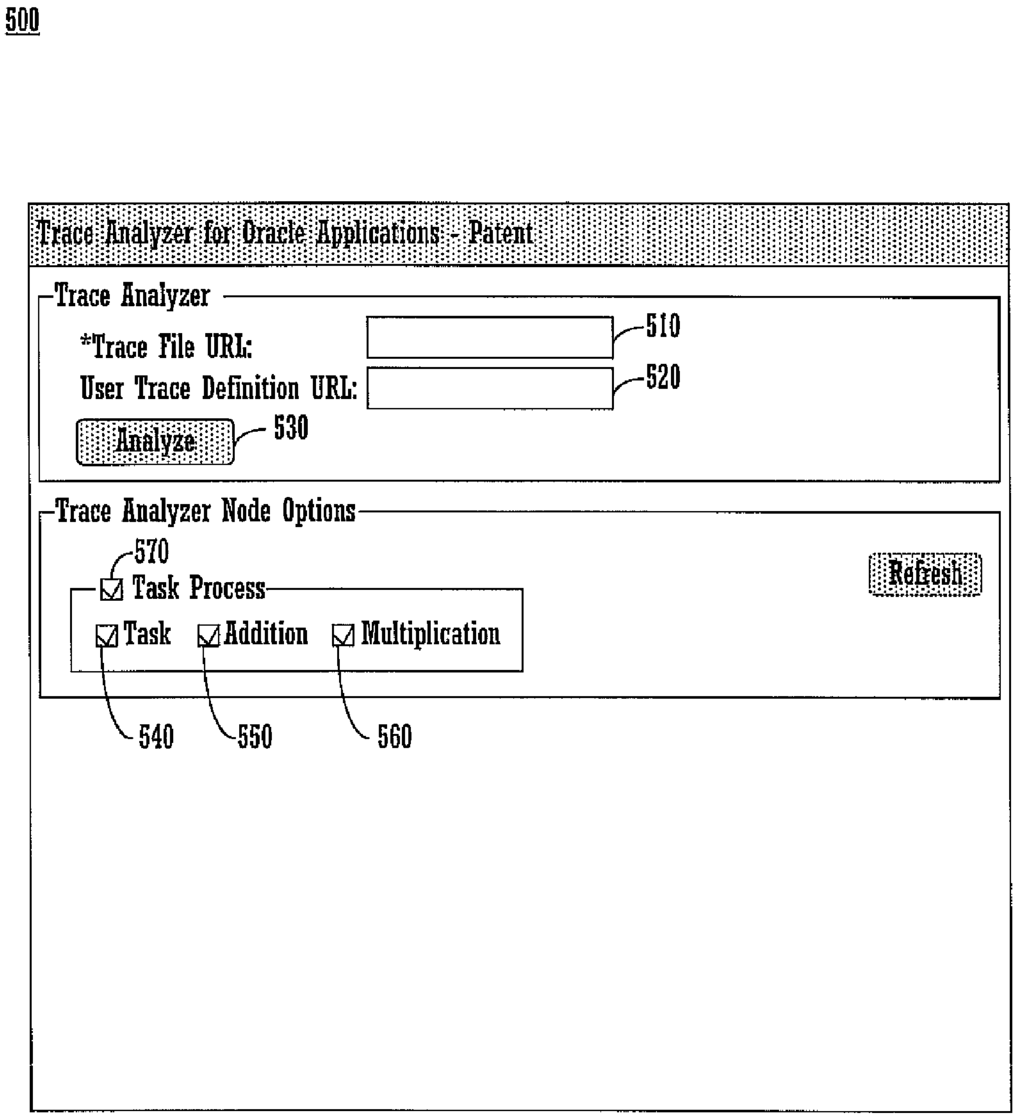
FIG. 5 shows an exemplary on-screen graphical user interface for initializing processing of log file data in accordance with one embodiment of the present invention.

FIG. 5 shows exemplary on-screen graphical user interface 500 for initializing processing of log file data in accordance with one embodiment of the present invention. As shown in FIG. 5, field 510 may be used to specify a location of, select, or otherwise identify a log file (e.g., comprising log file data 120) for processing (e.g., by module 140). Field 520 may be used to specify a location of, select, or otherwise identify tag information (e.g., a file comprising tag information 130) for processing (e.g., by module 140). Additionally, graphical object 530 may be used to initiate processing (e.g., by module 140) of the log file data (e.g., 120).

Figure 6:
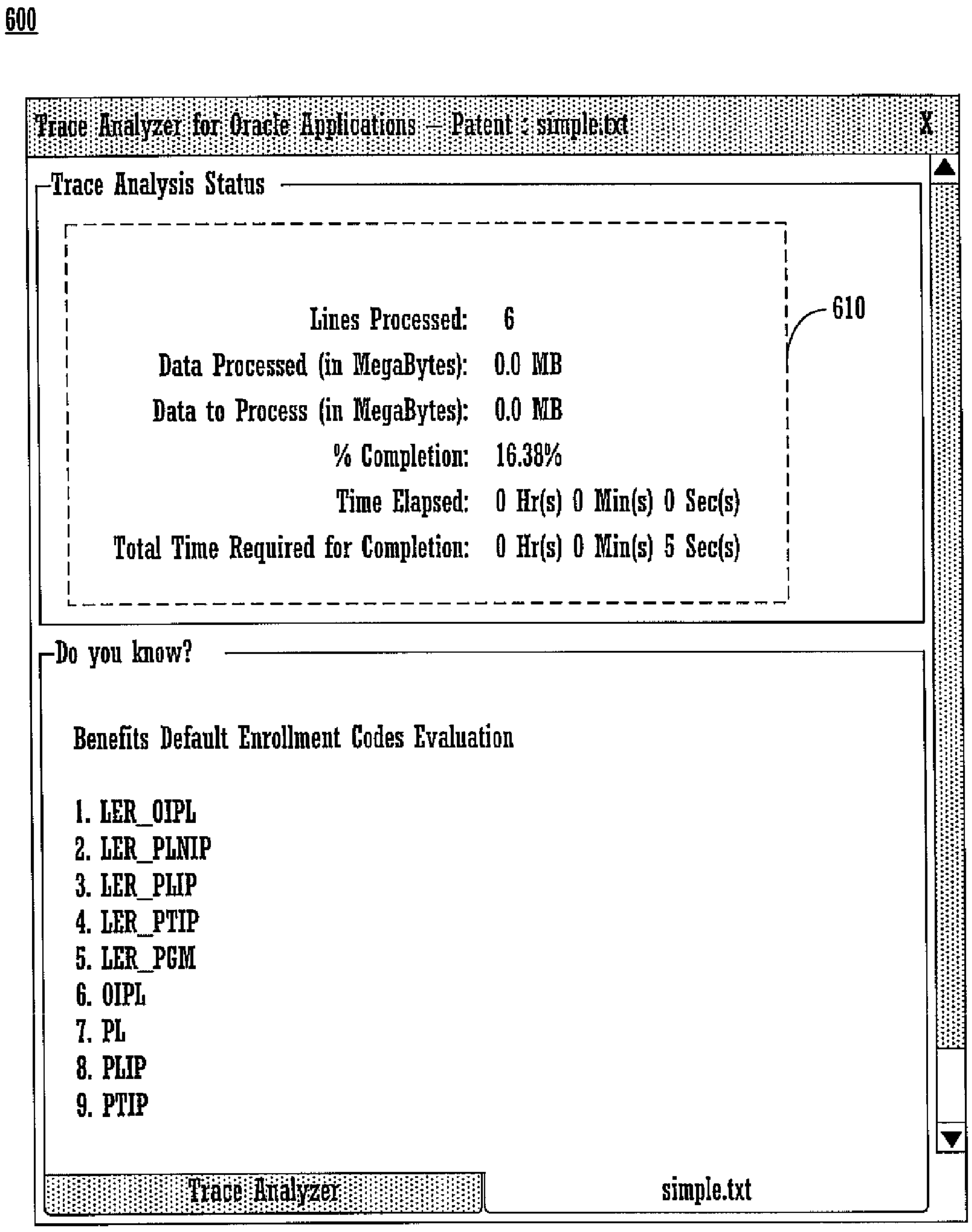
FIG. 6 shows an exemplary on-screen graphical user interface for communicating status information related to the log file data processing in accordance with one embodiment of the present invention.

FIG. 6 shows exemplary on-screen graphical user interface 600 for communicating status information related to the log file data processing in accordance with one embodiment of the present invention. As shown in FIG. 6, graphical user interface 600 may comprise status information 610 which may be updated during processing of the log file data (e.g., 120). For example, status information 610 may comprise a number of lines processed, an amount of data (e.g., log file data 120) already processed, an amount of data (e.g., log file data 120) remaining to be processed, a completion percentage of the processing (e.g., calculated by dividing the size of log file data 120 by the amount of data already processed), an elapsed time of the processing, and a total time for completion of all the processing.

Turning back to FIG. 5, graphical user interface 500 may also be used to select one or more functions for display (e.g., on display 160) on a graphical user interface (e.g., 400 of FIGS. 4A, 4B, and 4C) for presenting processed log file data 120. In one embodiment, graphical user interface 500 may be used to generate inputs (e.g., 142 as shown in FIG. 1) for configuring or programming module 140. For example, interaction with graphical object 540 may select and/or deselect the task function for presentation (e.g., on graphical user interface 400), interaction with graphical object 550 may select and/or deselect the addition function for presentation (e.g., on graphical user interface 400), and interaction with graphical object 560 may select and/or deselect the multiplication function for presentation (e.g., on graphical user interface 400). Alternatively, interaction with graphical object 570 may select and/or deselect all associated functions (e.g., the task function, addition function, and multiplication function) for presentation (e.g., on graphical user interface 400). It should be appreciated that one or more of graphical objects

540-560 may be deselected after graphical objects 540-560 have been selected using graphical object 570. Additionally, it should be appreciated that one or more of graphical objects 540-560 may be selected after graphical objects 540-560 have been deselected using graphical object 570.

Figure 7:
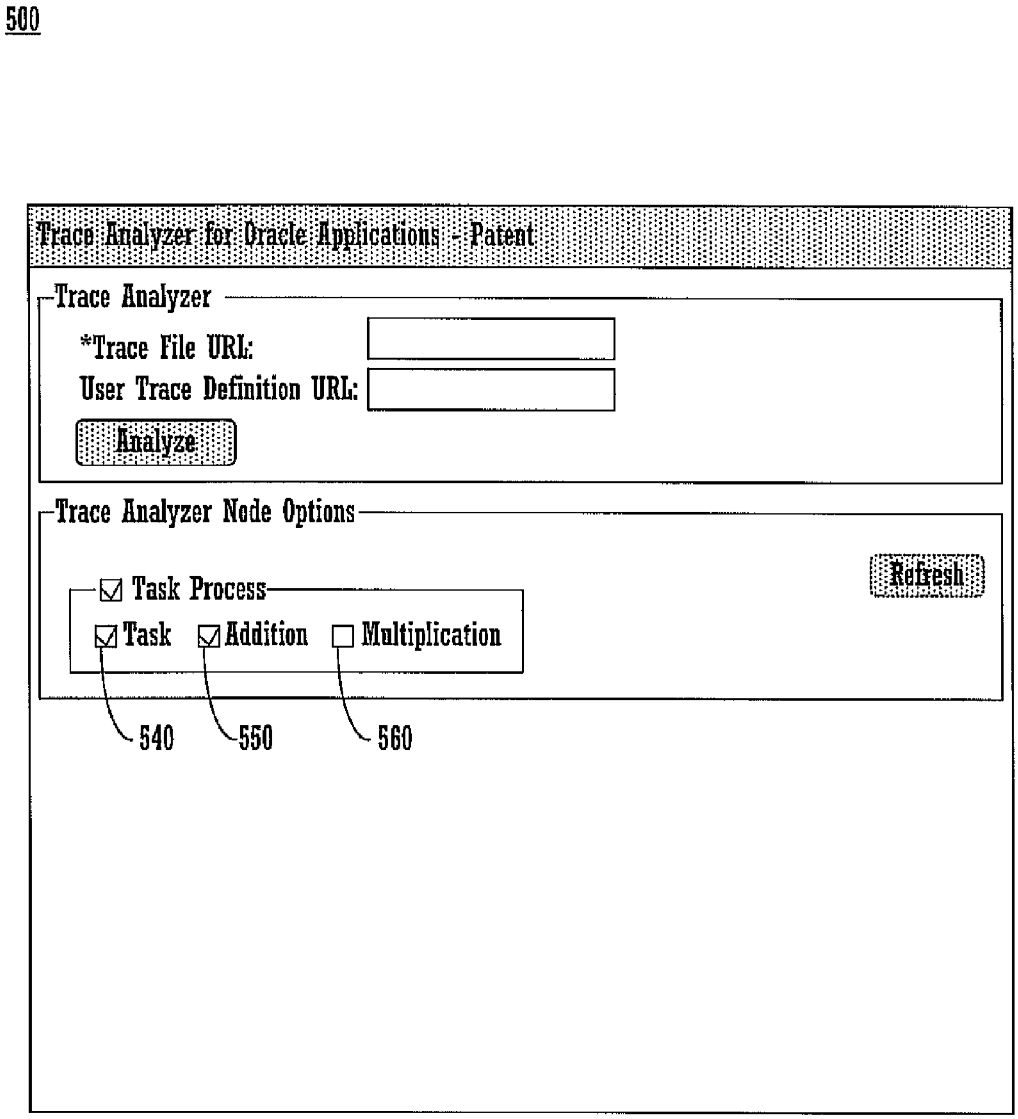
FIG. 7 shows an exemplary on-screen graphical user interface with a deselected function for hiding display of information related to that function on a graphical user interface in accordance with one embodiment of the present invention.
Figure 8:
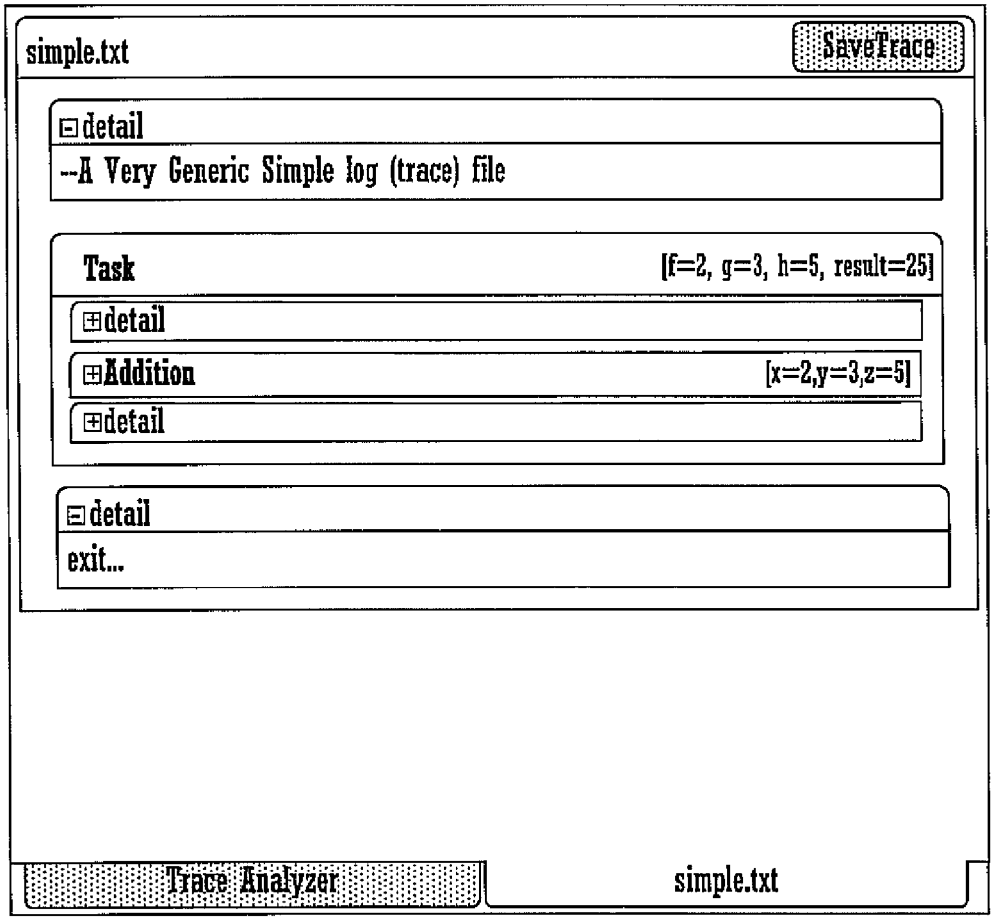
FIG. 8 shows an exemplary on-screen graphical user interface for presenting log file data while hiding information related to a function in accordance with one embodiment of the present invention.

FIG. 7 shows exemplary on-screen graphical user interface 500 with a deselected function for hiding display of information related to that function on graphical user interface 400 in accordance with one embodiment of the present invention. For example, as shown in FIG. 7, graphical object 560 (e.g., corresponding to the multiplication function) is deselected, while graphical objects 540 and 550 (e.g., corresponding to the task and addition functions, respectively) are selected. Accordingly, as shown in FIG. 8, graphical user interface 400 may display information related to the task and addition functions, while information related to the multiplication function is hidden.

Although FIG. 1 shows only six functions (e.g., 111-116), it should be appreciated that application 110 may comprise a larger or smaller number of functions in other embodiments. Additionally, although FIG. 1 depicts several distinct components (e.g., 110, 140, 150, 160, etc.), it should be appreciated that system 100 may comprise a larger or smaller number of components (e.g., combining the functionality of multiple components into a smaller number of components, dividing the functionality of a component into multiple components, etc.). Additionally, although only three functions (e.g., a task function, addition function, and multiplication function) are referenced in FIGS. 2-8, it should be appreciated that the application (e.g., 110) may comprise a larger or smaller number of functions in other embodiments.

Figure 9:
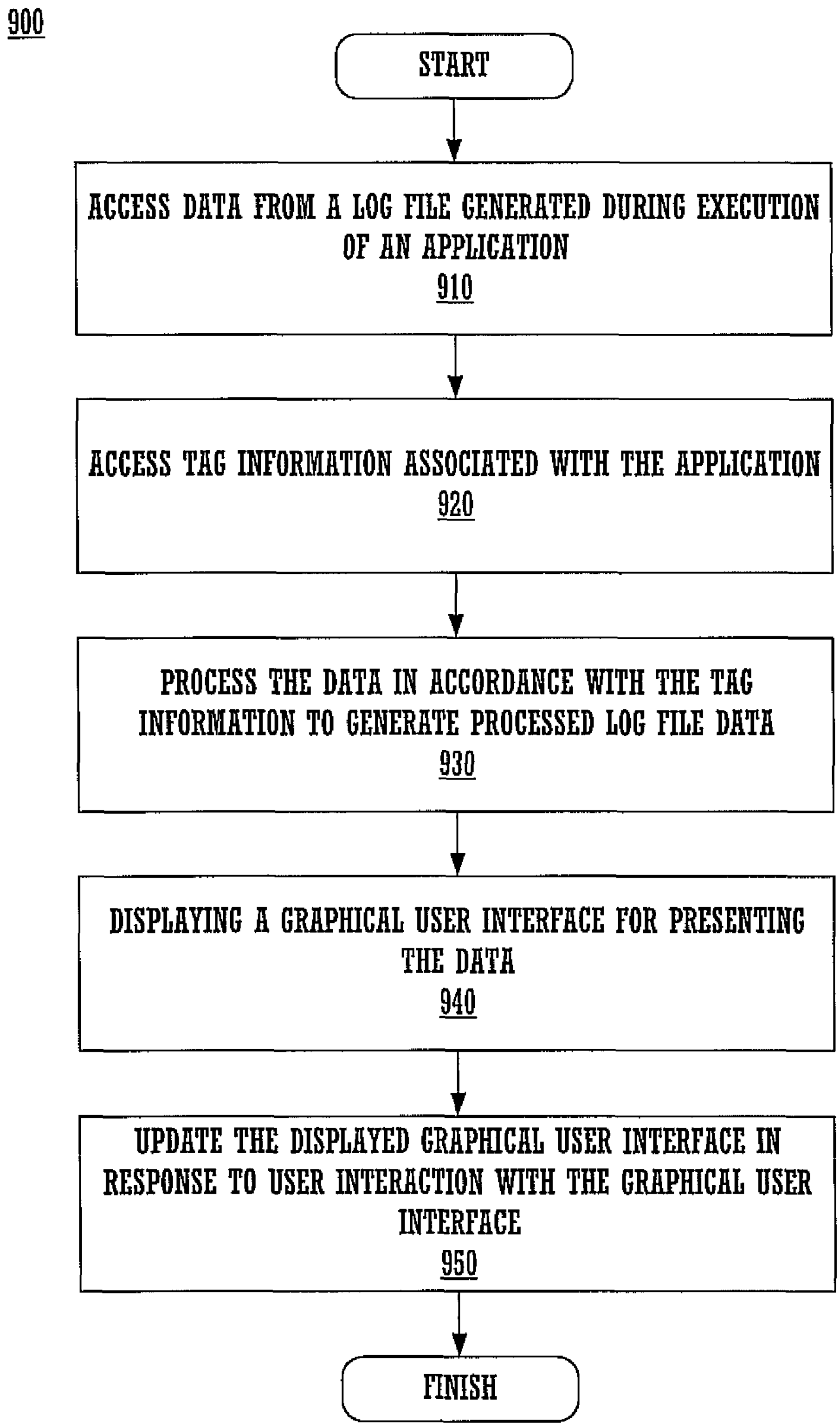
FIG. 9 shows an exemplary computer-implemented process for processing data from a log file in accordance with one embodiment of the present invention.

FIG. 9 shows exemplary computer-implemented process 900 for processing data from a log file in accordance with one embodiment of the present invention. As shown in FIG. 9, step 910 involves accessing data from a log file (e.g., log file data 120) generated during execution of an application (e.g., 110). The log file data (e.g., 120) may comprise a debug statement generated by the application, an entry point of a function of the application, an exit point of the function, an input parameter of the function, an output parameter of the function, or some combination thereof.

Step 920 involves accessing tag information (e.g., 130) associated with the application (e.g., 110). In one embodiment, tag information 130 may comprise a plurality of tags which may be used to create a hierarchy for organizing log file data 120. The tag information may comprise tags corresponding to function entry points, function exit points, function parameters (e.g., input parameters of a function, output parameters of a function, etc.), etc. Additionally, each tag may be associated with a node for organizing the log file data (e.g., 120).

Step 930 involves processing the data (e.g., 120) in accordance with the tag information (e.g., 130) to generate processed log file data (e.g., 145). The processed log file data (e.g., 145) may be formatted, structured, or otherwise organized according to the tag information (e.g., 130), additional information from the log file data (e.g., 120), inputs (e.g., 142), etc. The processing may be performed by a log file data analysis module (e.g., 140) in one embodiment. Additionally, step 930 may be performed in accordance with process 1000 of FIG. 10 in one embodiment.

As shown in FIG. 9, step 940 involves displaying a graphical user interface (e.g., 400) for presenting the data (e.g., 120). The graphical user interface (e.g., 400) may comprise a plurality of expandable and collapsible nodes (e.g., each associated with a respective function of the application). The graphical user interface (e.g., 400) may also comprise graphical objects (e.g., 612, 614, 616, 640, 650, etc.) associated with the nodes, where interaction with each graphical object may initiate display of a portion of the log file data associated with each respective node. In one embodiment, the graphical objects may be expanded to reveal more information or a larger portion of the log file data (e.g., 120), or the graphical objects may be collapsed to reveal less information or hide a portion of the log file data (e.g., 120). Additionally, where the tag information (e.g., 130) comprises at least one function parameter (e.g., input parameter, output parameter, etc.) associated with a function, the at least one function parameter may be displayed (e.g., when a node associated with the function is in a collapsed state, when the node associated with the function is in an expanded state, etc.) using the graphical user interface (e.g., 400). Further, child nodes (e.g., associated with nested functions) may be indented with respect to their parent node or parent nodes (e.g., associated with a function comprising the nested function associated with the child node).

Step 950 involves updating the displayed graphical user interface (e.g., 400) in response to user interaction with the graphical user interface (e.g., 400). For example, interaction with a node (e.g., 410) may cause the display and/or hiding of at least one child node (e.g., nodes 420 and 430) and/or at least one graphical object (e.g., 412, 414, 416, etc.) associated with the node (e.g., 410). As another example, interaction with a node (e.g., 420 and/or 430) may cause the display and/or hiding of log file data (e.g., 120) associated with each respective node (e.g., lines 11-18 of FIG. 2 associated with node 420, lines 23-30 of FIG. 2 associated with node 430, etc.).

Figure 10:
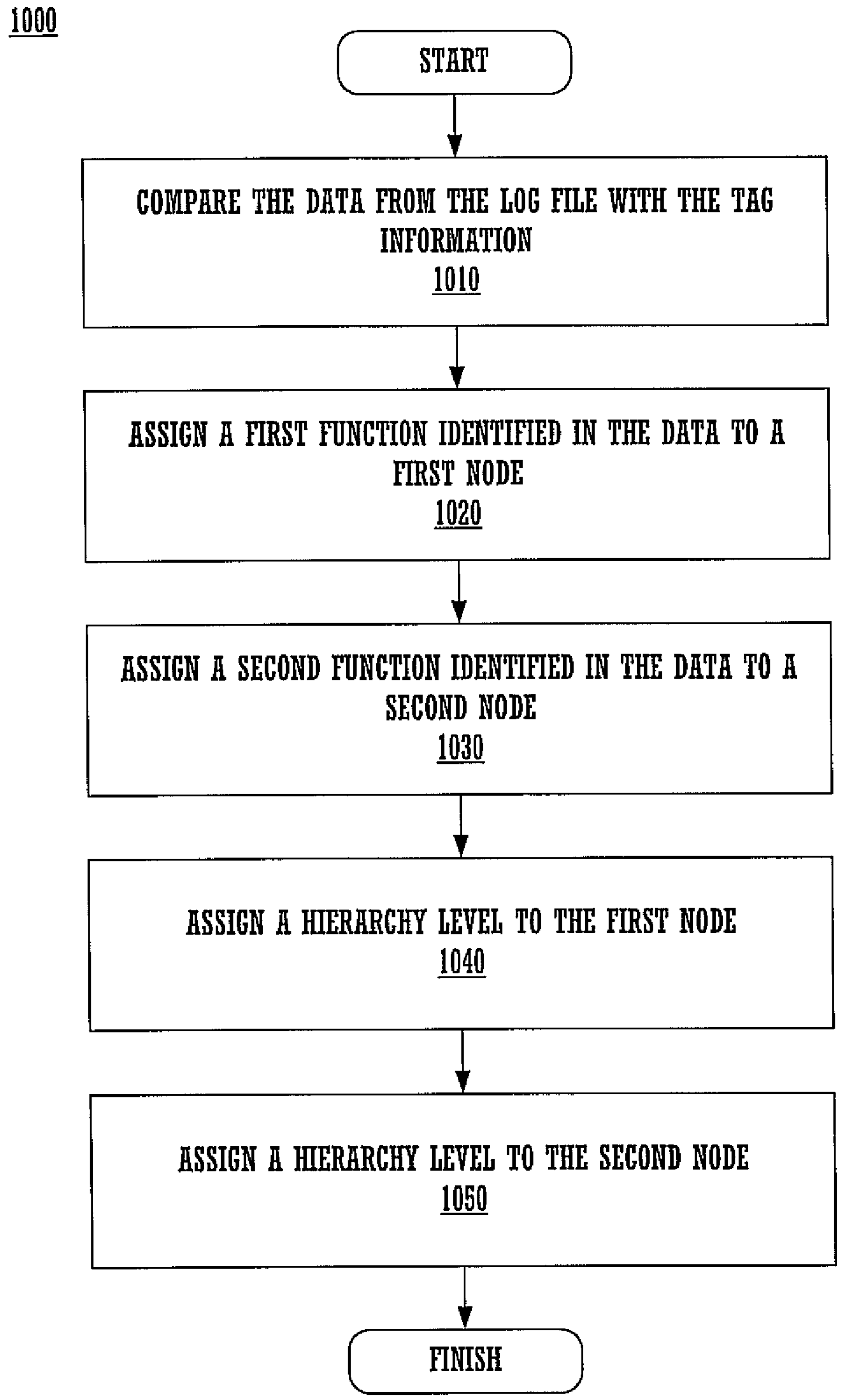
FIG. 10 shows an exemplary computer-implemented process for generating processed log file data in accordance with tag information in accordance with one embodiment of the present invention.

FIG. 10 shows exemplary computer-implemented process 1000 for generating processed log file data (e.g., 145) in accordance with tag information (e.g., 130) in accordance with one embodiment of the present invention. As shown in FIG. 10, step 1010 involves comparing the data from the log file (e.g., 120) with the tag information (e.g., 130). For example, a search query based upon a tag of the tag information (e.g., 130) may be used to search the log file data (e.g., 120). In one embodiment, the search may be used to identify a portion of the log file data (e.g., 120) associated with a function which is also associated with one or more tags (e.g., an entry point tag, an exit point tag, etc.) of the tag information (e.g., 130).

Step 1020 involves assigning a first function (e.g., of application 110) identified in the log file data (e.g., 120) to a first node (e.g., 410, 420, 430, etc.). Step 1030 involves assigning a second function (e.g., of application 110) identified in the log file data (e.g., 120) to a second node (e.g., 410, 420, 430, etc.).

As shown in FIG. 10, step 1040 involves assigning a hierarchy level to the first node. In one embodiment, the first node may be assigned a highest hierarchy level if the function associated with the first node is not called by any other function. This may be determined by examining the entry and exit points of the function (e.g., in log file data 120) associated with the first node, and comparing these entry and exit points with the entry and exit points of other functions of the application (e.g., also referenced in log file data 120). If the function associated with the first node is nested within a another function, the first node may be assigned a lower hierarchy level than the node associated with the parent function.

Step 1050 involves assigning a hierarchy level to the second node. In one embodiment, the second node may be assigned a highest hierarchy level if the function associated with the second node is not called by any other function. This may be determined by examining the entry and exit points of the function (e.g., in log file data 120) associated with the second node, and comparing these entry and exit points with the entry and exit points of other functions of the application (e.g., also referenced in log file data 120). If the function associated with the second node is nested within a another function, the second node may be assigned a lower hierarchy level than the node associated with the parent function.

Figure 11:
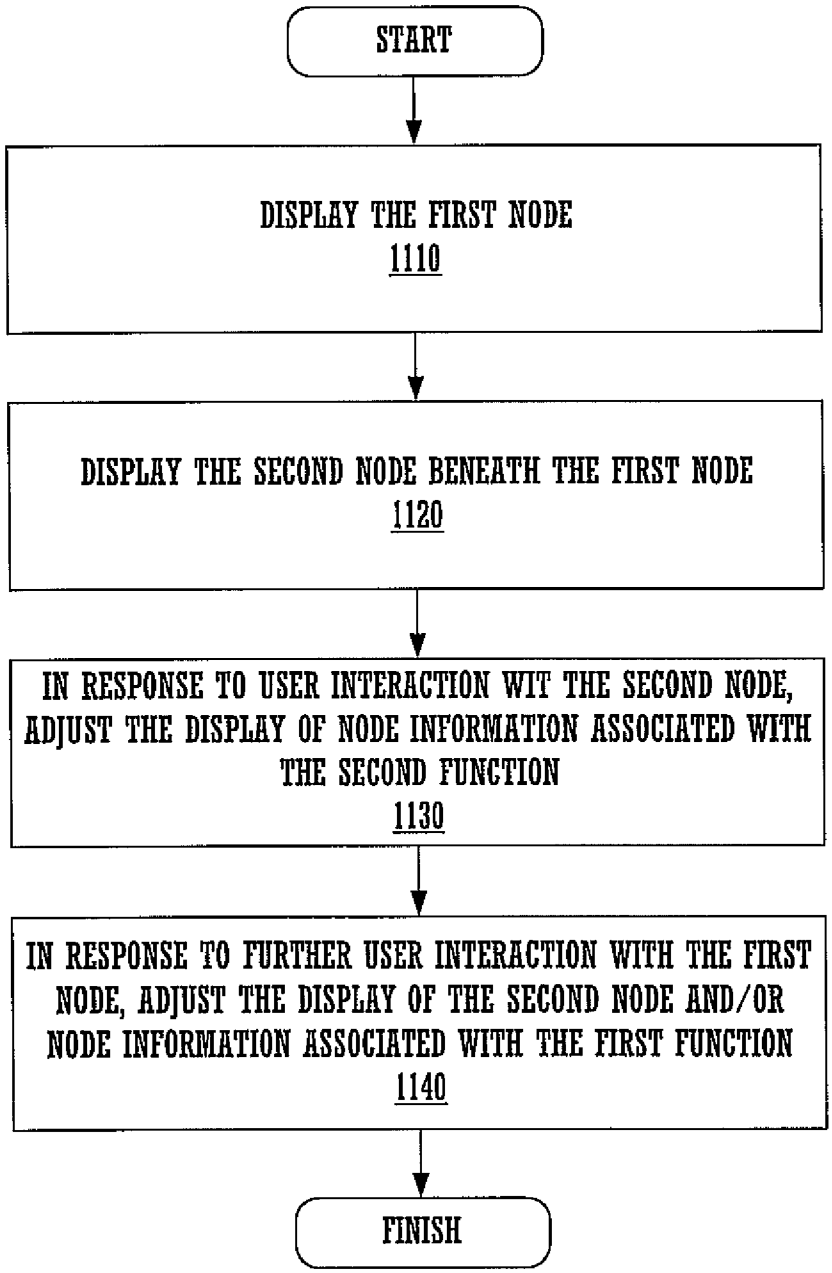
FIG. 11 shows an exemplary computer-implemented process 1100 for displaying a graphical user interface in accordance with one embodiment of the present invention.

FIG. 11 shows exemplary computer-implemented process 1100 for displaying a graphical user interface (e.g., 400) in accordance with one embodiment of the present invention. As shown in FIG. 11, step 1110 involves displaying the first node (e.g., 410, 420, 430, etc.). Step 1120 involves displaying the second node (e.g., 410, 420, 430, etc.) beneath the first node. If the second node is a child node of the first node, the second node may be displayed at a position indented with respect to a position of the first node.

Step 1130 involves adjusting the display of the node information associated with the second function in response to user interaction with the second node. In one embodiment, node information (e.g., lines 11-18 of log file data 120 as shown in FIG. 2 associated with node 420, lines 23-30 of log file data 120 as shown in FIG. 2 associated with node 430, etc.) associated with the second node (e.g., 420 and/or 430) may be displayed and/or hidden in response to interaction with the second node. The node information may comprise a portion of the log file data (e.g., 120) in one embodiment.

As shown in FIG. 11, step 1140 involves adjusting the display of the second node and/or node information associated with the first function in response to user interaction with the first node. In one embodiment, the second node (e.g., 420 and/or 430) may be displayed (e.g., as shown in FIGS. 4A and 4B) or hidden (e.g., as shown in FIG. 4C) in response to user interaction with the first node. Alternatively, node information (e.g., 413, 417, etc.) associated with the first function may be displayed (e.g., as shown in FIG. 4B) or hidden (e.g., as shown in FIGS. 4A and 4C) in response to user interaction with the first node.

FIG. 12 shows a display or print out of an exemplary log file data 120*a* for an error or exception in accordance with one embodiment of the present invention. As shown in FIG. 12, lines 1210 may represent a stack trace or portion of a stack trace generated in response to an error, exception, or the like. For example, the function "MUL" may be partially executed in response to an error or exception, and thus, lines 28-31 of log file data 120 of FIG. 2 may be omitted.

Figure 13:
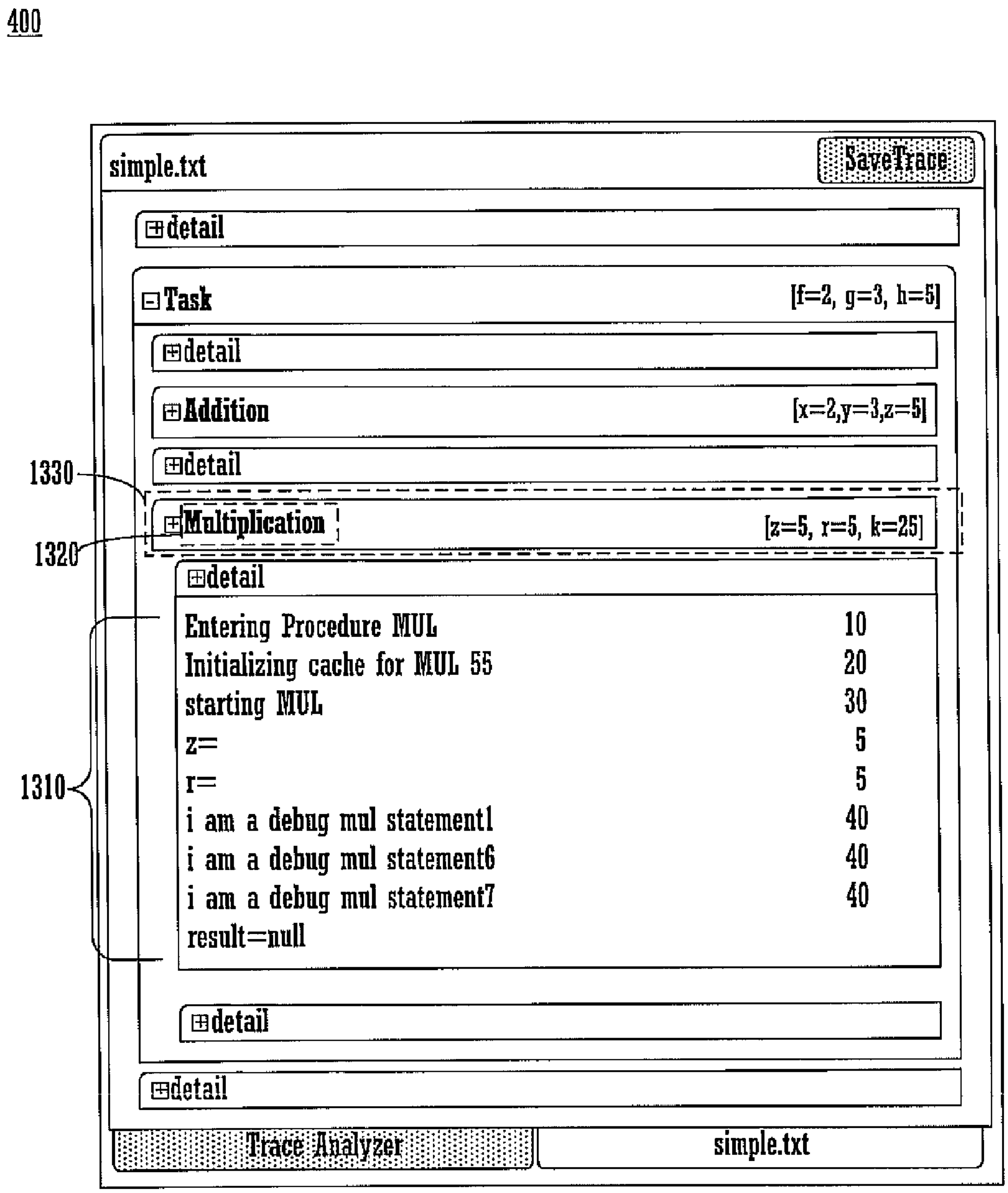
FIG. 13 shows an exemplary on-screen graphical user interface for indicating an error or exception in accordance with one embodiment of the present invention.

FIG. 13 shows exemplary on-screen graphical user interface 400 for indicating an error or exception in accordance with one embodiment of the present invention. As shown in FIG. 13, GUI 400 may present log file data 1310, which may correspond to lines 1210 of FIG. 12. GUI 400 may indicate an error or exception occurred and/or is associated with a function or process (e.g., the "MUL" function) by displaying altered heading 1320, where the heading or word "multiplication" may be displayed in a different color than other nodes headings, displayed with a different font style (e.g., bold, italic, etc.) than other headings, or the like. In another embodiment, GUI 400 may indicate that an error or exception occurred and/or is associated with a function or process (e.g., the "MUL" function) by displaying altered region 1330, where a visual attribute (e.g., color, shade, pattern, etc.) of region 1330 may be altered to indicate that the error or exception has occurred. In other embodiments, GUI 400 may alternatively indicate that an error or exception has occurred.

In one embodiment, the indication that an error and/or exception has occurred may be generated (e.g., by log file data analysis module 140) in response to a comparison of the log file data (e.g., 120*a*) with tag information (e.g., 130). For example, the omission of an expected tag (e.g., associated with an exit point of the "MUL" function) may indicate and error, and the stack trace (e.g., lines 1210) may be determined based upon the previous tag (e.g., an entry point of the "MUL" function) and/or another tag (e.g., the next tag after the expected and omitted exit tag of the "MUL" process). Additionally, the error or exception may be associated with a function to which the omitted tag corresponds (e.g., the "MUL" function), thereby enabling the display of the indicator (e.g., altered heading 1320, altered region 1330, etc.) for indicating the error or exception.

Alternatively, an error tag (e.g., in tag information 130) may be matched to a portion of the log file data (e.g., 120*a*) to determine that an error/exception occurred. For example, line 1220 of log file data 120*a* may indicate that an error or exception occurred. And in other embodiments, other means for identifying errors, exceptions, or the like may be used (e.g., using the omitted "MUL" function exit tag as well as line 1220, etc.), where the identified errors may then be indicated using GUI 400 (e.g., as discussed above).

Figure 14:
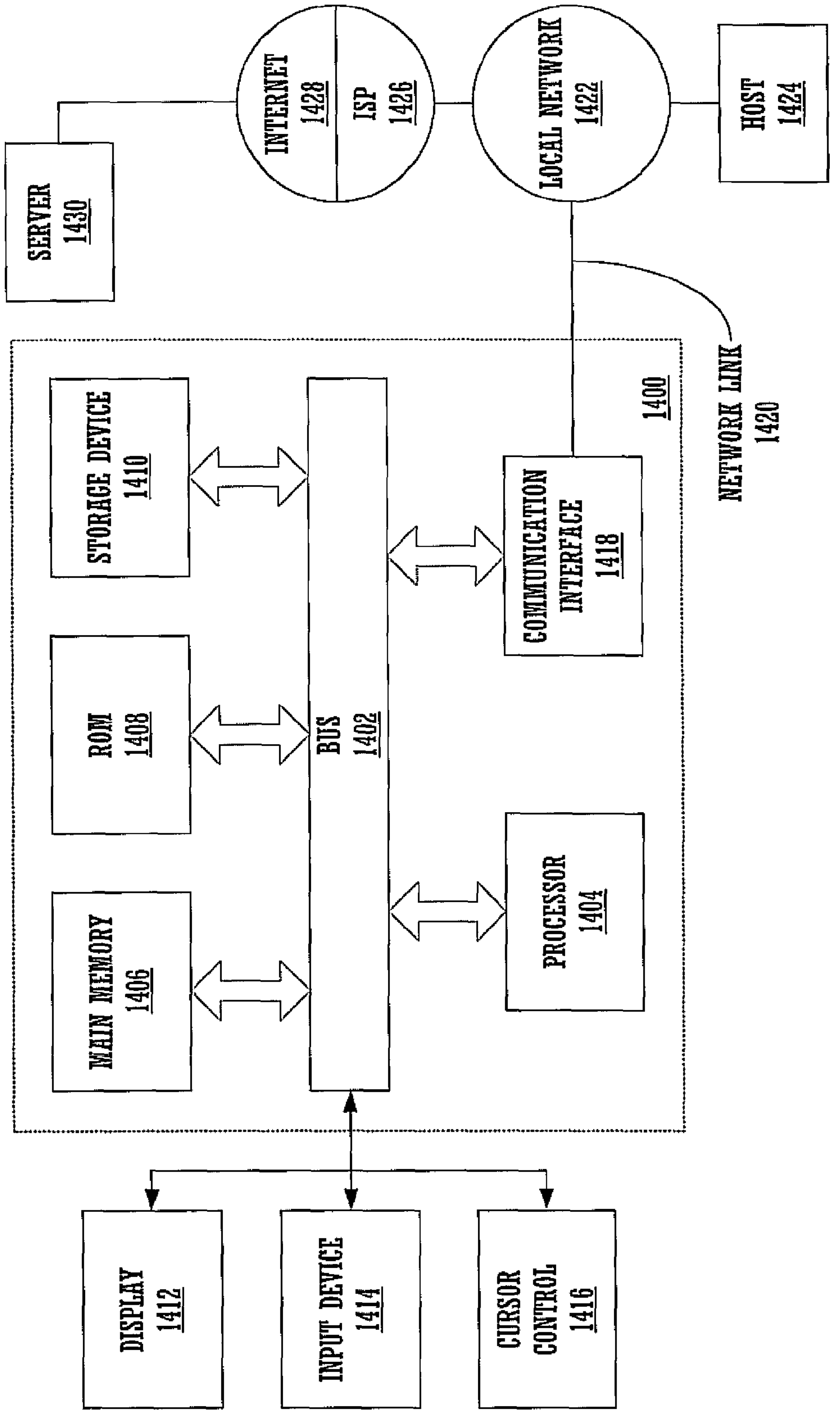
FIG. 14 shows an exemplary computer system upon which embodiments of the present invention may be implemented.

FIG. 14 shows exemplary computer system 1400 upon which embodiments of the present invention may be implemented. With reference to FIG. 14, portions of the present invention are comprised of computer-readable and computer-executable instructions that reside, for example, in computer system 1400 which may be used as a part of a general purpose computer network (not shown). It is appreciated that computer system 1400 of FIG. 14 is merely exemplary. As such, the present invention can operate within a number of different computer systems including general-purpose computer systems, embedded computer systems, laptop computer systems, hand-held computer systems, and stand-alone computer systems.

In the present embodiment, computer system 1400 includes an address/data bus 1402 for conveying digital information between the various components, a central processor unit (CPU) 1404 coupled to bus 1402 for processing the digital information and instructions, a volatile main memory 1406 coupled to bus 1402 comprised of volatile random access memory (RAM) for storing the digital information and instructions, and a non-volatile read only memory (ROM) 1408 coupled to bus 1402 for storing information and instructions of a more permanent nature. In addition, computer system 1400 may also include a data storage device 1410 (e.g., a magnetic, optical, floppy, tape drive, etc.) coupled to bus 1402 for storing larger amounts of data. Data (e.g., comprising instructions, commands, etc.) for performing a process (e.g., 900, 1000, 1100, etc.) for processing log file data and/or for displaying the processed log file data may be stored in main memory 1406, ROM 1408, storage device 1410, registers within processor 1404 (not shown), in an external storage device (not shown), or some combination thereof.

As shown in FIG. 14, computer system 1400 may be coupled via bus 1402 to an optional display device 1412 (e.g., a CRT monitor, LCD monitor, etc.) for displaying information received from computer system 1400. An optional input device 1414 (e.g., an alphanumeric keyboard) may also be coupled to computer system 1400 via bus 1402 for communicating information and command selections to processor 1404. Cursor control device 1416 (e.g., a mouse, trackball, light pen, etc.) may also be coupled to computer system 1400 via bus 1402 for communicating direction information and command selections to processor 1404 and for controlling cursor movement (e.g., on display 1412). Additionally, computer system 1400 can include a mechanism for emitting an audible signal (not shown).

Computer system 1400 may also include a communication interface 1418 coupled to bus 1402. Communication interface 1418 provides a two-way data communication coupling to local network 1422 via network link 1420. For example, communication interface 1418 may be an integrated services digital network (ISDN) device or a modem to provide a data communication connection to a corresponding type of telephone line. As another example, communication interface 1418 may be a local area network (LAN) device to provide a data communication connection to a compatible LAN. And as yet another example, network link 1420 may comprise a wireless connection between communication interface 1418 and local network 1422. Regardless of the implementation utilized, communication interface 1418 may send and receive electrical, electromagnetic, and/or optical signals that carry digital data streams representing various types of information.

As shown in FIG. 14, network link 1420 may provide data communication through one or more networks to other data devices. For example, network link 1420 may provide a connection through local network 1422 to a host computer 1424 or to data equipment operated by internet service provider (ISP) 1426. ISP 1426 in turn provides data communication services through the worldwide packet data communication network, now commonly referred to as the "internet" 1428. Local network 1422 and internet 1428 may use electrical, electromagnetic, and/or optical signals to convey digital data streams. The signals through the various networks and network link 1420, which carry digital data to and from computer system 1400, are exemplary forms of carrier waves transporting information.

Accordingly, computer system 1400 can send and receive messages through network(s), network link 1420, and communication interface 1418. For example, server 1430 might transmit a requested code for an application program through internet 1428, ISP 1426, local network 1422, and communication interface 1418. The received code may be executed by processor 1404 upon receipt, and/or be stored in one of the coupled memory devices (e.g., storage device 1410, ROM 1408, RAM 1406, etc.) for later execution.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-implemented method of processing data from a log file, said method comprising:

accessing said data from said log file, said data comprising a plurality of text entries generated during execution of an application and arranged chronologically based on execution of the application;

accessing tag information from a pre-defined tag information file stored separate from the log file and associated with said application, said application comprising a plurality of functions and said tag information comprising at least one predefined tag associated with a function entry point and at least one predefined tag associated with a function exit point for each of the plurality of functions, and wherein the log file data and the tag information together indicate a hierarchy of a plurality of nodes within the application; and processing said data in accordance with said tag information to generate processed log file data, wherein said processed log file data is arranged into the hierarchy of the plurality of nodes according to said tag information to facilitate application debugging operations.

2. The computer-implemented method of claim 1, wherein said data comprises information selected from a group consisting of a debug statement generated by said application, an entry point of a function of said application, an exit point of said function, an input parameter of said function, and an output parameter of said function.

3. The computer-implemented method of claim 1, wherein said processed log file data comprises information for displaying a hierarchy, said hierarchy for organizing said data using a plurality of nodes.

4. The computer-implemented method of claim 3, wherein said processing said data further comprises:

comparing said data from said log file with said tag information;

assigning data from said log file for a first function to a first node of the hierarchy of nodes in said processed log file data based upon said comparing; and assigning data from said log file for a second function to a second node of the hierarchy of nodes in said processed log file based upon said comparing, wherein said second function is nested within said first function, and wherein said second node comprises a child node of said first node.

5. The computer-implemented method of claim 4 further comprising:

displaying a graphical user interface for presenting said processed log file data and representing the hierarchy of the plurality if nodes, wherein said displaying further comprises:

displaying said first node;

displaying said second node beneath said first node; and in response to interaction with said second node, displaying node information associated with said second function, wherein said node information comprises a portion of said processed log file data assigned to said second node.

6. The computer-implemented method of claim 5, wherein said displaying said graphical user interface further comprises:

in response to further interaction with said second node, hiding said node information associated with said second node; and in response to interaction with said first node, hiding said second node.

7. The computer-implemented method of claim 5, wherein said tag information comprises at least one function parameter associated with said first function, and wherein said displaying said graphical user interface further comprises:

displaying said at least one function parameter when said first node is in a collapsed state, wherein said at least one function parameter is selected from a group consisting of an input parameter of said first function and an output parameter of said first function.

8. The computer-implemented method of claim 5, wherein said displaying said second node further comprises displaying said second node at a position indented from a position of said first node.

9. The method of claim 1, wherein the log file comprises a text format file.

10. The method of claim 9, wherein the tag information file comprises an eXtensible Markup Language (XML) format file.

11. The method of claim 10, wherein the processed log file data comprises XML format data.

12. A computer system comprising a processor coupled to a bus and a memory coupled to said bus, wherein said memory comprises instructions that when executed on said processor implement a method of processing data from a log file, said method comprising:

accessing said data from said log file, said data comprising a plurality of text entries generated during execution of an application and arranged chronologically based on execution of the application;

accessing tag information from a pre-defined tag information file stored separate from the tag file and associated with said application, said application comprising a plurality of functions and said tag information comprising at least one tag associated with a function entry point and at least one tag associated with a function exit point for each of the plurality of functions, and wherein the log file data and the tag information together indicate a hierarchy of a plurality of nodes within the application; and processing said data in accordance with said tag information to generate processed log file data, wherein said processed log file data is arranged into the hierarchy of the plurality of nodes according to said tag information to facilitate application debugging operations.

13. The computer system of claim 12, wherein said data comprises information selected from a group consisting of a debug statement generated by said application, an entry point of a function of said application, an exit point of said function, an input parameter of said function, and an output parameter of said function.

14. The computer system of claim 12, wherein said processed log file data comprises information for displaying a hierarchy, said hierarchy for organizing said data using a plurality of nodes.

15. The computer system of claim 14, wherein said processing said data further comprises:

comparing said data from said log file with said tag information;

assigning data from said log file for a first function to a first node of the hierarchy of nodes in said processed log file data based upon said comparing; and assigning data from said log file for a second function to a second node of the hierarchy of nodes in said processed log file based upon said comparing, wherein said second function is nested within said first function, and wherein said second node comprises a child node of said first node.

16. The computer system of claim 15, wherein said method further comprises:

displaying a graphical user interface for presenting said processed log file data and representing the hierarchy of the plurality if nodes, wherein said displaying further comprises:

displaying said first node;

displaying said second node beneath said first node; and in response to interaction with said second node, displaying node information associated with said second function, wherein said node information comprises a portion of said processed log file data assigned to said second node.

17. The computer system of claim 16, wherein said displaying said graphical user interface further comprises:

in response to further interaction with said second node, hiding said node information associated with said second node; and in response to interaction with said first node, hiding said second node.

18. The computer system of claim 16, wherein said tag information comprises at least one function parameter associated with said first function, and wherein said displaying said graphical user interface further comprises:

displaying said at least one function parameter when said first node is in a collapsed state, wherein said at least one function parameter is selected from a group consisting of an input parameter of said first function and an output parameter of said first function.

19. The computer system of claim 16, wherein said displaying said second node further comprises displaying said second node at a position indented from a position of said first node.

20. The system of claim 12, wherein the log file comprises a text format file.

21. The system of claim 20, wherein the tag information file comprises an eXtensible Markup Language (XML) format file.

22. The system of claim 21, wherein the processed log file data comprises XML format data.

23. A non-transitory computer-readable memory having stored thereon a sequence of instructions which, when executed by a processor, causes the processor to process data for a log file by:

accessing said data from said log file, said data comprising a plurality of text entries generated during execution of an application and arranged chronologically based on execution of the application;

accessing tag information from a pre-defined tag information file stored separate from the log file and associated with said application, said application comprising a plurality of functions and said tag information comprising at least one tag associated with a function entry point and at least one tag associated with a function exit point for each of the plurality of functions, and wherein the log file data and the tag information together indicate a hierarchy of a plurality of nodes within the application; and processing said data in accordance with said tag information to generate processed log file data, wherein said processed log file data is arranged into the hierarchy of the plurality of nodes according to said tag information to facilitate application debugging operations.

24. The computer-readable memory of claim 23, wherein said data comprises information selected from a group consisting of a debug statement generated by said application, an entry point of a function of said application, an exit point of said function, an input parameter of said function, and an output parameter of said function.

25. The computer-readable memory of claim 23, wherein said processed log file data comprises information for displaying a hierarchy, said hierarchy for organizing said data using a plurality of nodes.

26. The computer-readable memory of claim 25, wherein said processing said data further comprises:

comparing said data from said log file with said tag information;

assigning data from said log file for a first function to a first node of the hierarchy of nodes in said processed log file data based upon said comparing; and assigning data from said log file for a second function to a second node of the hierarchy of nodes in said processed log file based upon said comparing, wherein said second function is nested within said first function, and wherein said second node comprises a child node of said first node.

27. The computer-readable memory of claim 26 further comprising:

displaying a graphical user interface for presenting said processed log file data and representing the hierarchy of the plurality if nodes, wherein said displaying further comprises:

displaying said first node;

displaying said second node beneath said first node; and in response to interaction with said second node, displaying node information associated with said second function, wherein said node information comprises a portion of said processed log file data assigned to said second node.

28. The computer-readable memory of claim 27, wherein said displaying said graphical user interface further comprises:

in response to further interaction with said second node, hiding said node information associated with said second node; and in response to interaction with said first node, hiding said second node.

29. The computer-readable memory of claim 27, wherein said tag information comprises at least one function parameter associated with said first function, and wherein said displaying said graphical user interface further comprises:

displaying said at least one function parameter when said first node is in a collapsed state, wherein said at least one function parameter is selected from a group consisting of an input parameter of said first function and an output parameter of said first function.

30. The computer-readable memory of claim 27, wherein said displaying said second node further comprises displaying said second node at a position indented from a position of said first node.

31. The computer-readable memory of claim 23, wherein the log file comprises a text format file, the tag information file comprises an eXtensible Markup Language (XML) format file, and the processed log file data comprises XML format data.

* * * * *

UNITED STATES PATENT AND TRADEMARK OFFICE

CERTIFICATE OF CORRECTION

PATENT NO. : 9,098,626 B2
APPLICATION NO. : 12/060762
DATED : August 4, 2015
INVENTOR(S) : Gajula et al.

It is certified that error appears in the above-identified patent and that said Letters Patent is hereby corrected as shown below:

In drawings,

On sheet 14 of 17, in figure 11, under Reference Numeral 1130, line 1, after "INTERACTION" delete "WIT" and insert -- WITH --, therefor.

In specification,

In column 4, line 35, delete ""querying"" and insert -- "querying," --, therefor.

In claims,

In column 16, line 33, in Claim 5, after "plurality" delete "if" and insert -- of --, therefor.

In column 17, line 54, in Claim 16, after "plurality" delete "if" and insert -- of --, therefor.

In column 19, line 8, in Claim 27, after "plurality" delete "if" and insert -- of --, therefor.

Signed and Sealed this
Fifteenth Day of March, 2016

Michelle K. Lee

Michelle K. Lee
*Director of the United States Patent and Trademark Office*